(12) United States Patent
Shimizu

(10) Patent No.: US 7,464,177 B2
(45) Date of Patent: Dec. 9, 2008

(54) MOBILE NETWORK THAT ROUTES A PACKET WITHOUT TRANSFERRING THE PACKET TO A HOME AGENT SERVER

(75) Inventor: Keiichi Shimizu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 906 days.

(21) Appl. No.: 10/475,315

(22) PCT Filed: Feb. 20, 2002

(86) PCT No.: PCT/JP02/01497

§ 371 (c)(1),
(2), (4) Date: Oct. 20, 2003

(87) PCT Pub. No.: WO03/071749

PCT Pub. Date: Aug. 28, 2003

(65) Prior Publication Data

US 2004/0117508 A1    Jun. 17, 2004

(51) Int. Cl.
*G06F 13/00* (2006.01)
(52) U.S. Cl. .................. 709/238; 709/225; 709/249
(58) Field of Classification Search .......... 709/217, 709/218, 219, 223, 225, 238, 249
See application file for complete search history.

(56) References Cited

U.S. PATENT DOCUMENTS

| 5,325,362 | A | 6/1994 | Aziz | |
| 6,466,556 | B1* | 10/2002 | Boudreaux | 370/331 |
| 6,725,047 | B1* | 4/2004 | Farley et al. | 455/456.3 |
| 6,904,466 | B1* | 6/2005 | Ishiyama et al. | 709/245 |

(Continued)

FOREIGN PATENT DOCUMENTS

EP    1 009 141 A1    6/2000

(Continued)

OTHER PUBLICATIONS

Shingo Murakami et al., 99-HI-86 "Kyokai router o mochiita mobile IP no keiro saitekika ni kansuru kenkyu" Information Processing Society of Japan Kenkyu Hokoku, vol. 99, No. 97, pp. 7-12 Nov. 1999.
C. Perkins: "IP mobility support" Request for Comments: 2000, IBM Network Working Group Oct. 1996.
Maurizio Dell'Abate, et al. "Performance Evaluation of Mobile IP Protocols in a Wireless Environment", Communications, XP-010284684, Jun. 1998, pp. 1810-1816.
Wen-Tsuen Chen, et al. "Some Mechanisms to Improve TCP/IP Performance Over Wireless and Mobile Computing Environment", Parallel and Distributed Systems, XP-010504427, Jul. 2000, pp. 437-444.

(Continued)

*Primary Examiner*—Viet Vu
(74) *Attorney, Agent, or Firm*—Oblon, Spivak, McClelland, Maier & Neustadt, P.C.

(57) ABSTRACT

A mobile network that is a subnet that partially constitutes multiple IP networks includes a home agent server for managing identifiers of a plurality of mobile terminals each of which joins the mobile network, and a plurality of IP tunnel routers. When a mobile terminal moves from the subnet to another subnet that partially constitutes the multiple IP networks, the home agent server accepts destination information necessary for transmission of IP packets to the mobile terminal from the mobile terminal, and delivers IP tunnel setting information indicating the mobile terminal and the destination information to the plurality of IP tunnel routers. When then receiving an IP packet destined for the mobile terminal, each of the plurality of IP tunnel routers transfers the IP packet to the mobile terminal based on the IP tunnel setting information without making the IP packet go through the home agent server.

2 Claims, 16 Drawing Sheets

U.S. PATENT DOCUMENTS

| | | | |
|---|---|---|---|
| 6,980,566 B2 * | 12/2005 | Melick et al. | 370/471 |
| 7,031,279 B2 * | 4/2006 | Lee et al. | 370/331 |
| 7,184,418 B1 * | 2/2007 | Baba et al. | 370/331 |
| 2001/0036834 A1 * | 11/2001 | Das et al. | 455/458 |
| 2002/0021689 A1 * | 2/2002 | Robbins et al. | 370/352 |
| 2002/0080752 A1 * | 6/2002 | Johansson et al. | 370/338 |

FOREIGN PATENT DOCUMENTS

| | | |
|---|---|---|
| EP | 1 161 032 A2 | 12/2001 |
| JP | 07-170286 | 7/1995 |
| JP | 2001-168906 | 6/2001 |
| JP | 2001-508276 | 6/2001 |
| JP | 2001-339752 | 12/2001 |
| JP | 2002-44141 | 2/2002 |

OTHER PUBLICATIONS

Ravi Jain, et al. "Mobile Internet Access and QoS Guarantees Using Mobile IP and RSVP With Location Registers", Communications, XP-010284628, Jun. 1998, pp. 16901695.

Y. Bernet, et al. "Requirements of Diff-Serv Boundary Routers", Internet Engineering Task Force, XP-015010784, No. 1, Nov. 1998, p. 1-30.

Raghuram Vadali, et al "Agent-Based Route Optimization for Mobile IP" Vehicular Technology Conference, XP-010562472, vol. 1 of 4, conf 54, Oct. 2001, pp. 2731-2735.

* cited by examiner

FIG.4

| DESTINATION ADDRESS | SENDING SOURCE ADDRESS | PROCESSING | ENCAPSULATED DESTINATION ADDRESS | ENCAPSULATED SENDING SOURCE ADDRESS |
|---|---|---|---|---|
| 201.240.123.122 | — | ENCAPSULATION | 190.274.98.176 | 201.240.123.1 |
| 201.240.123.130 | — | ENCAPSULATION | 200.223.245.17 | 201.240.123.1 |
| …… | …… | …… | …… | …… |

FIG.7

| DESTINATION ADDRESS | SENDING SOURCE ADDRESS | PROCESSING | ENCAPSULATED DESTINATION ADDRESS | ENCAPSULATED SENDING SOURCE ADDRESS |
|---|---|---|---|---|
| 201.240.123.0 | 190.274.98.176 | DECAPSULATION | — | — |
| 201.240.123.0 | 200.223.245.17 | DECAPSULATION | — | — |
| …… | …… | …… | …… | …… |

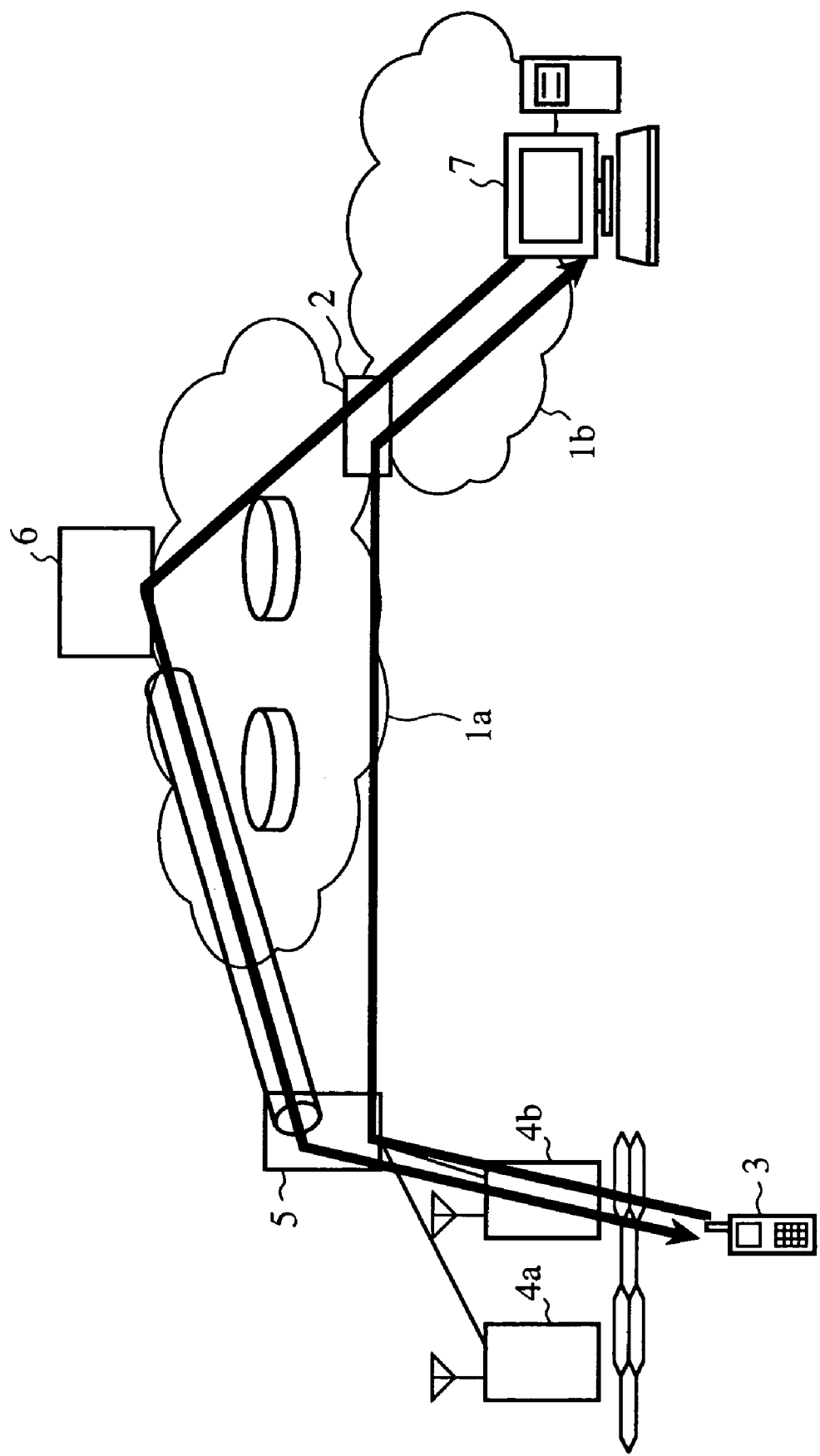

MOBILE NETWORK THAT ROUTES A PACKET WITHOUT TRANSFERRING THE PACKET TO A HOME AGENT SERVER

FIELD OF THE INVENTION

The present invention relates to a mobile network.

BACKGROUND OF THE INVENTION

Mobile IP is proposed as a method of, when a mobile terminal having an IP (internet protocol) address moves from a subnet that partially constitutes multiple IP networks to another subnet that partially constitutes the multiple IP networks, making it possible for the mobile terminal to maintain communications without interrupting sessions. The mobile IP is defined by RFC (Request for Comment: Document including information about the Internet) 2002 of IETF (Internet Engineering Task Force: Internet technology special investigation committee).

An example of a mobile network using the mobile IP is shown in FIG. 17. In the figure, reference numerals 1a and 1b denote IP networks, reference numeral 2 denotes a network gateway, reference numeral 3 denotes a mobile terminal, reference numerals 4a, 4b, and 4c denote base stations, reference numeral 5 denotes a foreign agent (FA), and reference numeral 7 denotes a communication node (CN).

The IP networks 1a and 1b are different IP networks that constitute a set of multiple IP networks, and operate according to different protocols. Each of the IP networks 1a and 1b has a plurality of routers. It is assumed that the IP network 1b shown in the figure is the Internet. The IP networks 1a and 1b are connected to each other by way of the network gateway 2 that makes these IP networks interwork.

The mobile terminal 3 shown in the figure joins the IP network 1a, and obtains service provided by the IP network 1a under normal circumstances. In other words, the IP network 1a is a home network, i.e., a home domain for the mobile terminal 3 shown in the figure. The mobile terminal 3 has a function of communicating with another mobile terminal according to the mobile IP, and can obtain service even if it moves to another IP network included in the multiple IP networks.

The FA 5 belongs to another subnet that partially constitutes the multiple IP networks, and provides an address (i.e., a care-of address) specifying the other subnet, to which the FA 5 belongs, to mobile terminals that have moved to the other subnet from still other subnets. The base stations 4a and 4b shown in the figure belong to the same subnet as that to which the FA 5 belongs. Although only the FA 5 is shown in FIG. 17, two or more subnets can be connected to the IP network 1a in the multiple IP networks.

According to the mobile IP, the HA 6 is placed within the home domain (e.g., the IP network 1a) of a mobile terminal (e.g., the mobile terminal 3). An IP address (i.e., a home address) that can be used in this home domain is assigned to any mobile terminal that is under the charge of the IP network 1a. The mobile terminal 3 has a storage unit (not shown in the figure) for storing the home address thereof, and the HA 6 has a storage unit (not shown in the figure) for storing the home addresses of all mobile terminals that join the subnet thereof. When the mobile terminal has moved to a location where it can obtain service provided by another subnet, the HA 6 manages the address of another FA 5 that belongs to the other subnet where the mobile terminal 3 exists now as the location of the mobile terminal 3. Therefore, when the mobile terminal 3 detects that it has moved from an area that is under the charge of an old FA or the HA 6 to another area that is under the charge of a new FA 5, the mobile terminal 3 registers an address (referred to as a care-of address) specifying the new FA 5 as the address indicating the destination of the mobile terminal 3 in the HA 6 by way of the new FA 5.

When the CN 7 linked with the IP network 1b transmits an IP packet to the mobile terminal 3, the HA 6 that manages the care-of address of the mobile terminal 3 catches the IP packet, which are destined for the home address of the mobile terminal 3. Then, the HA 6 transfers the caught IP packet to a registered FA (in the case of FIG. 17, the FA 5) by way of an IP tunnel. Here, transfer of IP packets via an IP tunnel means transfer of the IP packets to an FA with encapsulation of IP packets that the HA has received into IP packets in another format having an IP header indicating a sending source address (e.g., the IP address specifying the HA 6) and a destination address (e.g., the care-of address specifying the FA 5). When receiving an encapsulated IP packet, the FA retrieves an original IP packet from the encapsulated IP packet and then transfers it to the mobile terminal 3 that is the destination. This mechanism implements the mobile transmissivity of the mobile terminal 3 in accordance with the mobile IP.

On the other hand, as a method of implementing IP packet transmission from the mobile terminal 3 to the CN 7, there have been provided a method of transmitting IP packets by way of a normal routing route and a method of transmitting IP packets by way of a tunnel between an FA and an HA (the latter method is called a reverse tunnel method).

A problem encountered with a prior art mobile network constructed as mentioned above is that loads are concentrated on an HA, as explained below.

Because the HA 6 has a function of performing signaling processing according to the mobile IP (e.g., calling for the destination) and a function of performing IP tunnel transfer processing on user packets, the traffic and load are concentrated on the HA. In addition, because while a plurality of FAs can be installed at geographically dispersed areas to which the mobile terminal 3 can move, only one HA is installed in each home domain (i.e., each subnet), the load is further concentrated on the HA. Therefore, the HA easily becomes a bottleneck on the network, and the trouble tolerance of the network is reduced. A further problem arises in the scalability of the multiple IP networks because the load on each HA increases with an increase in the number of subnets.

The problem of such concentration of loads can arise in the FA 5 that makes a report about the roaming of a mobile terminal to the HA 6, and that decapsulates packets to be transmitted to the destination and transfers them to the destination.

Furthermore, triangular routing as shown in FIG. 17 can be provided because IP packets destined for a mobile terminal are basically transmitted to a corresponding FA by way of the HA. More concretely, IP packets to be transmitted from a mobile terminal to the CN 7 are transmitted from the FA 5 to the network gateway 2 by way of one or more routers without using a reverse tunnel passing through the HA. Therefore, there causes a time delay different between the forward and backward directions of transmission because IP packets are passed through a route different depending on the direction of transmission of the IP packets, and this can result in the occurrence of trouble.

DISCLOSURE OF THE INVENTION

The present invention is proposed to solve the above-mentioned problems, and it is therefore an object of the present invention to provide a mobile network that can prevent concentration of loads on one piece of equipment.

In accordance with the present invention, there is provided a mobile network that is a subnet that partially constitutes multiple IP networks, the mobile network including: a home agent server for managing identifiers of a plurality of mobile terminals each of which joins the mobile network; and a plurality of IP tunnel routers, when a mobile terminal moves another subnet that partially constitutes the multiple IP networks, the home agent server accepting destination information necessary for transmission of IP packets to the mobile terminal from the mobile terminal, and delivering IP tunnel setting information indicating the mobile terminal and the destination information to the plurality of IP tunnel routers, and, when then receiving an IP packet destined for the mobile terminal, each of the plurality of IP tunnel routers transferring the IP packet to the mobile terminal based on the IP tunnel setting information without making the IP packet go through the home agent server.

As a result, because each of the plurality of IP tunnel routers transfers an IP packet to the mobile terminal located outside the mobile network without making the IP packet go through the home agent server, the traffic and load of the home agent server can be reduced. Therefore, the mobile network can prevent the occurrence of a bottleneck point and can implement communications more smoothly as compared with prior art mobile networks, thereby improving the scalability of the multiple IP networks. Furthermore, even if trouble occurs in the home agent server or either of the plurality of IP tunnel routers, because transfer of IP packets can be implemented by using other nodes without troubles, the mobile IP network will have a large tolerance to troubles.

In the mobile network in accordance with another aspect of the present invention, when receiving the IP tunnel setting information from the home agent server, each of the plurality of IP tunnel routers registers information necessary for decapsulating encapsulated IP packets that originate from the mobile terminal associated with the IP tunnel setting information therein. As a result, during backward-direction communications from the mobile terminal, the mobile network uses a reverse IP tunnel via which encapsulated IP packets are transmitted. Therefore, the mobile IP becomes applicable in the network in which backward-direction IP packet communications from the mobile terminal cause an access violation at an IP address.

In the mobile network in accordance with a further aspect of the present invention, each of the plurality of IP tunnel routers has a function of insuring service quality, in response to a request regarding service quality from the mobile terminal that moves to the other subnet that partially constitutes the multiple IP networks, the home agent server delivers service quality information indicating the request regarding service quality to the plurality of IP tunnel routers, and, when then receiving an IP packet destined for the mobile terminal, each of the plurality of IP tunnel routers transfers the IP packet based on the service quality information. As a result, the mobile network can set an IP tunnel flow in consideration of the quality of service.

In accordance with another aspect of the present invention, the mobile network further includes at least one buffer for temporarily storing IP packets, and, when recognizing occurrence of a handoff of the mobile terminal, the home agent server controls each of the plurality of IP tunnel routers and the buffer so that each of the plurality of IP tunnel routers stores a received IP packet destined for the mobile terminal in the buffer, when recognizing completion of the handoff of the mobile terminal, controls the buffer so that the buffer transfers the IP packet stored therein to the mobile terminal, and, when then receiving an IP packet destined for the mobile terminal, controls each of the IP tunnel routers so that each of the IP tunnel routers transfers the IP packet to the mobile terminal based on the IP tunnel setting information without making the IP packet go through the home agent server. As a result, the proper use of the buffer installed in the mobile network makes it possible to apply the mobile IP to a communication environment in which any loss of IP packets is not permitted.

In accordance with a further aspect of the present invention, the mobile network further includes a bicasting unit that can create a copy of the received IP packet and can transmit both the received IP packet and the copy by way of different routes, when recognizing occurrence of a handoff of the mobile terminal, the home agent server controls each of the plurality of IP tunnel routers and the bicasting unit so that each of the plurality of IP tunnel routers transmits the IP packet by using the bicasting unit, and the bicasting unit transmits both the IP packet and the copy by way of two routes that are used before and after the handoff, respectively, according to control done by the home agent server, and characterized in that, when recognizing completion of the handoff of the mobile terminal, the home agent server controls each of the plurality of IP tunnel routers so that each of the plurality of IP tunnel routers terminates transferring of the IP packet to the bicasting unit, and, when then receiving an IP packet destined for the mobile terminal, controls each of the plurality of IP tunnel routers so that each of the IP tunnel routers transfers the IP packet to the mobile terminal based on the IP tunnel setting information without making the IP packet go through the home agent server. As a result, the proper use of the bicasting unit installed in the mobile network makes it possible to apply the mobile IP to a communication environment in which any delay time is not allowed to occur in IP packets.

In the mobile network in accordance with another aspect of the present invention, the home agent server selects a subnet candidate that the mobile terminal can use based on control information received from the mobile terminal, selects an IP tunnel router associated with the selected subnet candidate, and transmits the IP tunnel setting information to the selected IP tunnel router. As a result, because the home agent server transmits the IP tunnel setting information only to one or more IP tunnel routers which the mobile terminal can use, the entire number of control messages transmitted from the home agent server to the plurality of IP tunnel routers within the mobile network can be reduced.

In the mobile network in accordance with a further aspect of the present invention, the home agent server determines a communication service that can be provided to the mobile terminal based on the control information received from the mobile terminal, selects a subnet candidate in which the communication service can be provided, selects an IP tunnel router associated with the selected subnet candidate, and transmits the IP tunnel setting information to the selected IP tunnel router. As a result, because the home agent server transmits the IP tunnel setting information only to one or more IP tunnel routers which the mobile terminal can use, the entire number of control messages transmitted from the home agent server to the plurality of IP tunnel routers within the mobile network can be reduced.

In the mobile network in accordance with another aspect of the present invention, the home agent server delivers no IP tunnel setting information to the plurality of IP tunnel routers before catching an IP packet destined for the mobile terminal that has moved to the other subnet that partially constitutes the multiple IP networks. As a result, the home agent server doesn't send out the IP tunnel setting information when there is no necessity to transmit IP packets destined for the mobile terminal that has left from the mobile network. Therefore, the entire number of control messages transmitted from the home agent server to the plurality of IP tunnel routers can be reduced.

In the mobile network in accordance with another aspect of the present invention, when catching an IP packet destined for the mobile terminal that has moved to the other subnet that partially constitutes the multiple IP networks, the home agent server transfers the IP packet to the mobile terminal based on destination information. As a result, even when catching an IP packet destined for the mobile terminal that has left from the subnet to which the home agent server belongs, the home agent server can transfer this IP packet without loss of the IP packet.

In the mobile network in accordance with another aspect of the present invention, the home agent server selects a subnet candidate that the mobile terminal can use based on control information received from the mobile terminal, selects an IP tunnel router associated with the selected subnet candidate, and transmits the IP tunnel setting information to the selected IP tunnel router. As a result, because the home agent server transmits the IP tunnel setting information only to an IP tunnel router which the mobile terminal can use, the entire number of control messages transmitted from the home agent server to the plurality of IP tunnel routers can be reduced.

In the mobile network in accordance with another aspect of the present invention, when catching an IP packet destined for the mobile terminal that has moved to the other subnet from an IP tunnel router that is not selected, the home agent server transmits the IP tunnel setting information to the IP tunnel router. As a result, even when receiving an IP packet from an IP tunnel router not selected, an appropriate IP tunnel can be established.

In accordance with another aspect of the present invention, there is provided a mobile network that is a subnet that partially constitutes multiple IP networks, the mobile network including: a foreign agent server for managing an identifier of a mobile terminal that does not join the mobile network and that can obtain service provided by the mobile network; and an IP tunnel router, when the mobile terminal moves from another subnet that partially constitutes the multiple IP networks to the mobile network, the foreign agent server transmits destination information necessary for transmission of IP packets to the mobile terminal to a subnet that the mobile terminal originally joins, and, when then receiving an IP packet destined for the mobile terminal, the IP tunnel router transfers the IP packet to the mobile terminal without making the IP packet go through the foreign agent server. As a result, because an IP tunnel router can transfer IP packets to the mobile terminal that roams into the mobile network without making them pass through the foreign agent server, the traffic carried by and the load imposed on the foreign agent server can be reduced.

BRIEF DESCRIPTION OF THE FIGURES

FIG. 4 is a diagram showing a visualized tunnel processing information file that is set to each IP tunnel router of the mobile network in accordance with embodiment 1 of the present invention;

FIG. 7 is a diagram showing a visualized tunnel processing information file that is set to each IP tunnel router of the mobile network in accordance with embodiment 2 of the present invention;

FIG. 17 is a diagram showing an operation of a prior art mobile IP network.

PREFERRED EMBODIMENTS OF THE INVENTION

In order to explain the present invention in greater detail, the preferred embodiments will be described below with reference to the accompanying figures.

Embodiment 1

Figure 1:
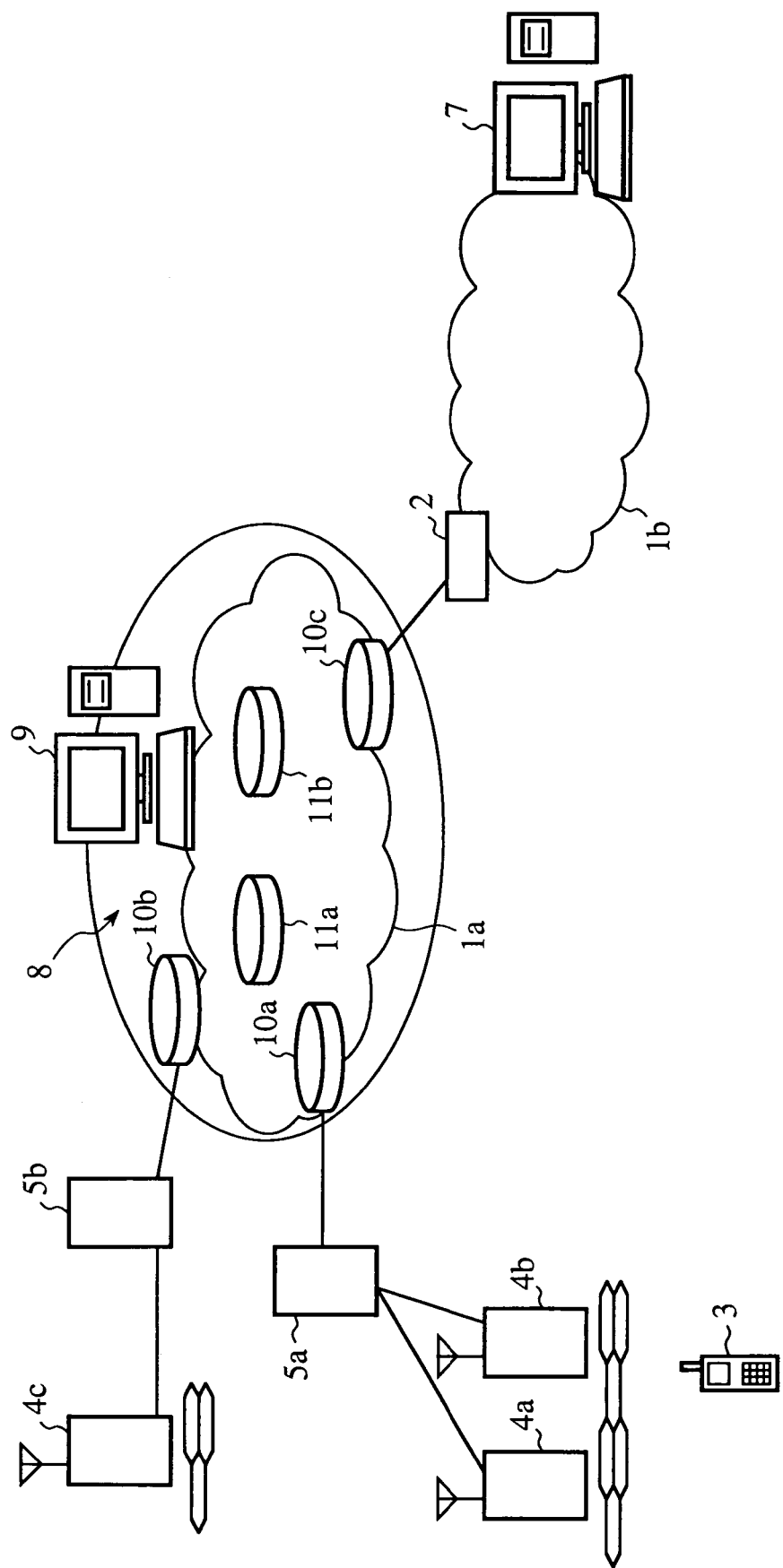
FIG. 1 is a diagrammatic view showing the structure of a mobile network in accordance with embodiment 1 of the present invention.

FIG. 1 shows multiple IP networks including a mobile network in accordance with embodiment 1 of the present invention. In the figure, reference numerals 1a and 1b denote IP networks, reference numeral 2 denotes a network gateway, reference numeral 3 denotes a mobile terminal, reference numerals 4a, 4b, and 4c denote base stations, reference numerals 5a and 5b denote foreign agents (FAs), reference numeral 7 denotes a communication node (CN), reference numeral 8 denotes a virtual home agent (HA), reference numeral 9 denotes a home agent (HA) server, reference numerals 10a to 10c denote IP tunnel routers, and reference numerals 11a and 11b denote routers.

The IP networks 1a and 1b are different IP networks each of which partially constitutes multiple IP networks, and operate according to different protocols. Each of the IP networks 1a and 1b has a plurality of routers. It is assumed that the IP network 1b shown in the figure is the Internet. The IP networks 1a and 1b are connected to each other by way of the network gateway 2 that makes these IP networks interwork.

The mobile terminal 3 shown in the figure joins the IP network 1a, and obtains service provided by the IP network 1a under normal circumstances. In other words, the IP network 1a is a home network, i.e., a home domain for the mobile terminal 3 shown in the figure. The mobile terminal 3 has a function of communicating with another mobile terminal according to mobile IP, and, even if the mobile terminal 3 moves to another IP network included in the multiple IP networks, can obtain service provided by the other IP network.

Each of the FAs 5a and 5b belongs to another subnet that partially constitutes the multiple IP networks, and provides an address (i.e., a care-of address) specifying the other subnet, to which each of the FAs belongs, to mobile terminals that have moved to the other subnet from other subnets. Each of the FAs 5a and 5b is disposed in control equipment of the corresponding subnet to which each of the FAs belongs, e.g., a network gateway that connects the IP network 1b with the subnet so as to make them interwork.

The base stations 4a and 4b shown in the figure belong to the same subnet as that to which the FA 5a belongs, and the base station 4c belongs to the same subnet as that to which the FA 5b belongs. Although only the two FAs 5a and 5b are shown in FIG. 1, three or more subnets can be connected to the IP network 1a in the multiple IP networks.

In accordance with this embodiment 1, the virtual HA 8 is disposed within the home domain (e.g., the IP network 1a) of a mobile terminal (e.g., the mobile terminal 3). The virtual HA 8 is provided with the HA server 9 and the plurality of IP tunnel routers 10a to 10c. The HA server 9 has a function similar to that of Media Gateway Controller (MGC) described according to MEGACO (Multimedia Gateway Control Protocol) defined by IETF, and each of the plurality of IP tunnel routers 10a to 10c has a function similar to that of Media Gateway (MG). The HA server 9 and the plurality of IP tunnel routers 10a to 10c implement communications similar to those in accordance with MEGACO (RFC3015) defined by IETF in cooperation with each other.

In this IP network 1a, the plurality of IP tunnel routers 10a to 10c and the routers 11a and 11b are provided for transfer of IP packets, and the plurality of IP tunnel routers 10a to 10c are connected directly to a plurality of pieces of control equipment respectively disposed in other subnets, i.e., the FAs 5a and 5b and the network gateway 2, respectively. In other words, the plurality of IP tunnel routers 10a to 10c are located on the edge of this mobile network, i.e., the IP network 1a. Each of the plurality of IP tunnel routers 10a to 10c transfers IP packets transmitted thereto from a subnet other than the IP network 1a to another router, and transfers IP packets transmitted thereto from another router to a subnet other than the IP network 1a.

On the other hand, each of the routers 11a and 11b transfers IP packets from mobile terminals that currently exist in the IP network 1a to another router, and transfers IP packets from another router to mobile terminals that currently exist in the IP network 1a. Each of the plurality of IP tunnel routers 10a to 10c can also have the same function as such a function of each of the routers 11a and 11b.

An IP address (i.e., a home address) that can be used in this home domain is fixedly assigned to each mobile terminal that is under the charge of the IP network 1a. A storage unit (not shown in the figure) of the mobile terminal 3 stores the home address of the mobile terminal 3 therein, and a storage unit (not shown in the figure) of the HA server 9 stores the home addresses of all mobile terminals that join the subnet to which the HA server belongs.

When the mobile terminal 3 moves to an area in which the mobile terminal 3 obtains service provided by another subnet, the address of an FA 5 (e.g., the FA 5a) belonging to a subnet where the mobile terminal 3 exists is managed, as the location of the mobile terminal 3, by the whole of the virtual HA 8. Therefore, when detecting that the mobile terminal 3 has moved to an area that is under the charge of a new FA (e.g., the FA 5a) from an area that is under the charge of an old FA or the virtual HA 8, the mobile terminal 3 registers an address (referred to as a care-of address) specifying the new FA 5a, as the address of the destination of the mobile terminal, in the HA server 9 of the virtual HA 8 by way of the new FA 5a. The HA server 9 notifies the care-of address to all of the plurality of IP tunnel routers 10a to 10c. Each of the plurality of IP tunnel routers 10a to 10c has a storage unit for storing the care-of address of each mobile terminal that has moved from the IP network 1a to another subnet.

Next, a description will be made as to an operation of the mobile network in accordance with embodiment 1 of the present invention. The following explanation will be made with reference to FIG. 3 that is a control flow diagram showing a sequence of control executed among various nodes in the multiple IP networks including the mobile network in accordance with embodiment 1. Assume that the mobile network operates according to the mobile IP of IPv4 (Internet Protocol version 4), as will be explained below.

Furthermore, assume that the mobile terminal (MT) 3 has moved from an area that is under the charge of an old FA or the virtual HA 8 to an area that is under the charge of a subnet corresponding to a new FA (e.g., the FA 5a). When detecting that the mobile terminal 3 has moved to an area that is under the charge of the new FA 5a, the mobile terminal 3 transmits a regional registration message which complies with the mobile IP to the FA 5a. Because the home address of the mobile terminal 3 is indicated by this regional registration message, the FA 5a recognizes that the mobile terminal 3 having this home address has moved to the area that is under the charge of the subnet associated with the FA 5a itself.

When receiving the regional registration message, the FA 5a assigns an identifier effective in the subnet associated therewith to the mobile terminal 3 by performing internal processing, and transmits a regional registration message of another type (i.e., a second regional registration message) to the HA server 9. This second regional registration message indicates the home address of the mobile terminal 3 and an IP address (i.e., a care-of address) specifying the FA 5a. Therefore, the HA server 9 recognizes that the mobile terminal 3 can obtain service from the FA 5a.

When receiving the second regional registration message, the HA server 9 updates registered information about the mobile terminal 3 stored in the storage unit thereof according to this second regional registration message. Furthermore, the HA server 9 delivers IP tunnel setting information indicating the mobile terminal 3 and the subnet from which the mobile terminal 3 newly obtains service to all of the plurality of IP tunnel routers 10*a* to 10*c* located on the edge of the IP network 1*a* to which the HA server 9 belongs.

More concretely, the IP tunnel setting information indicates the home address of the mobile terminal 3 and the IP address (i.e., the care-of address) specifying the FA 5*a*. Therefore, each of the plurality of IP tunnel routers 10*a* to 10*c* recognizes that the mobile terminal 3 can obtain service provided by the FA 5*a*. When receiving this IP tunnel setting information, each of the plurality of IP tunnel routers 10*a* to 10*c* updates (designated by reference character ET shown in FIG. 3) a tunnel processing information file stored in the storage unit thereof according to the IP tunnel setting information.

FIG. 4 is a diagram showing an example of the tunnel processing information file registered to each of the plurality of IP tunnel routers 10*a* to 10*c* included in the mobile network in accordance with embodiment 1 of the present invention. The tunnel processing information file has fields in which a destination address, processing, an encapsulated destination address, and an encapsulated sending source address are described, as shown in FIG. 4. The home address of each mobile terminal (e.g., the mobile terminal 3) that joins the IP network 1*a* and that currently obtains service provided by another subnet is described as the destination address.

"Encapsulation" is described as the nature of the processing. The care-of address of an FA (e.g., the FA 5*a*) associated with a subnet from which each mobile terminal (e.g., the mobile terminal 3) obtains service is described as the encapsulated destination address. The IP address of the IP tunnel router 10*a*, 10*b* or 10*c* that has generated the tunnel processing information file is described as the encapsulated sending source address. As the encapsulated sending source address, the IP address of the HA server 9 can be used instead of the IP address of the IP tunnel router 10*a*, 10*b*, or 10*c*. In addition, the tunnel processing information file has a field in which the sending source address is described, and which is not used.

The destination address field of the tunnel processing information file defines a condition for execution of the tunnel processing using encapsulation. In other words, when the destination address of IP packets that each of the plurality of IP tunnel routers 10*a* to 10*c* receives from any external node is described in the destination address field of the tunnel processing information file, each of the plurality of IP tunnel routers 10*a* to 10*c* carries out the tunnel processing using encapsulation.

During this tunnel processing, each of the plurality of IP tunnel routers 10*a* to 10*c* encapsulates each received IP packet into an IP packet in another format, the encapsulated IP packet having an IP header specifying the encapsulated sending source address (i.e., an IP address specifying the IP tunnel router 10*a*, 10*b* or 10*c* or an IP address specifying the HA server 9) and the encapsulated destination address (i.e., a care-of address specifying an FA, e.g., the FA 5*a*). Each of the plurality of IP tunnel routers then transmits the encapsulated IP packet to the FA associated with the encapsulated destination address, e.g., the FA 5*a*.

Figure 2:
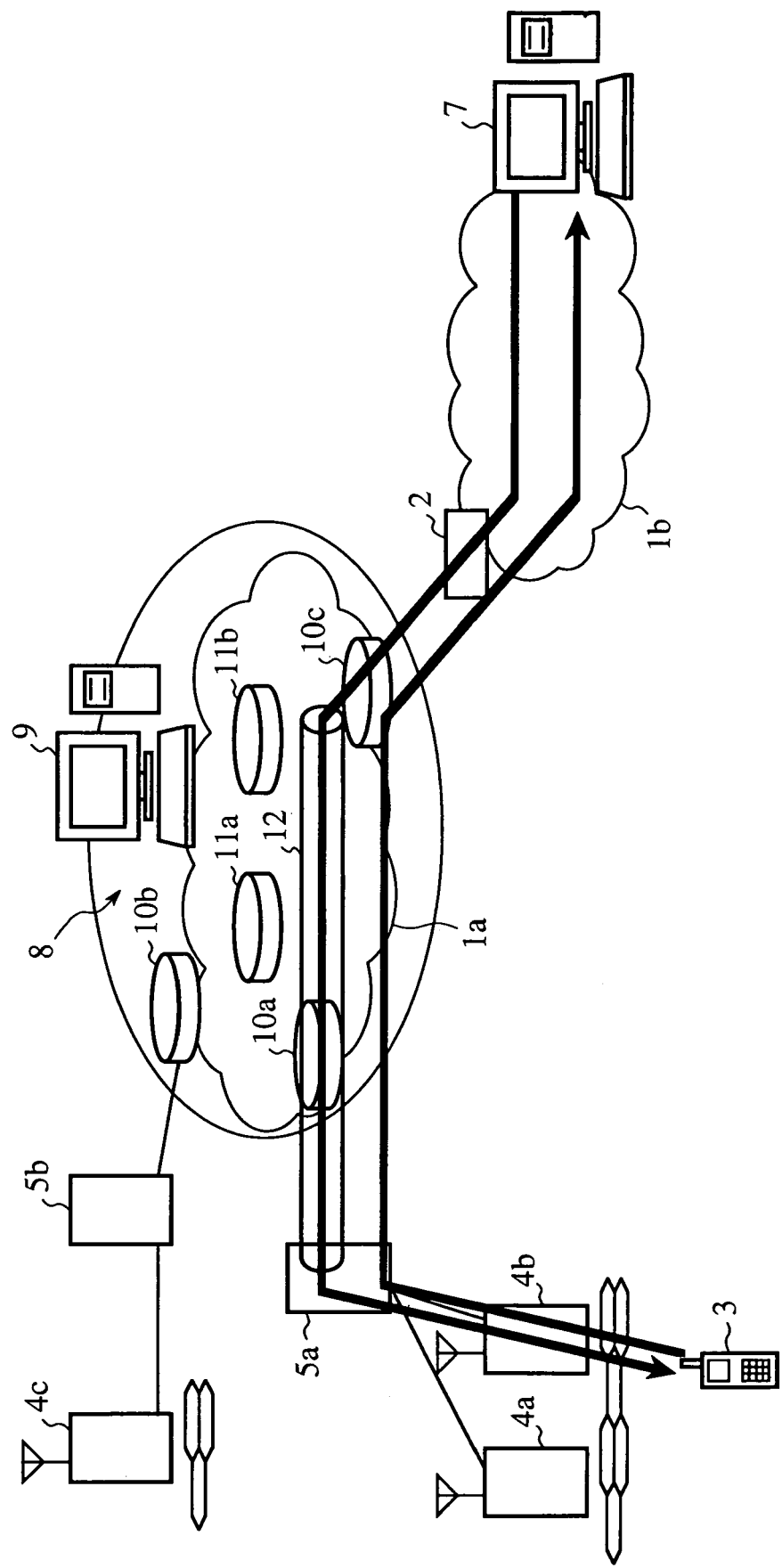
FIG. 2 is a diagrammatic view showing a flow of user IP packets (i.e., a flow of user plane data) in accordance with embodiment 1 of the present invention.
Figure 3:
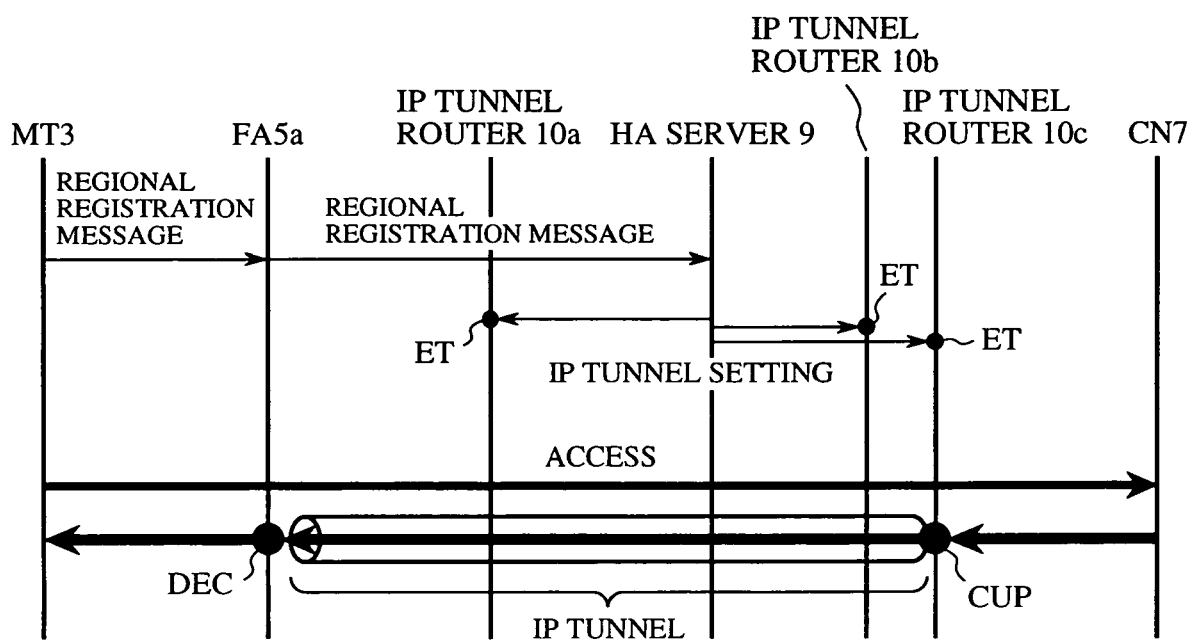
FIG. 3 is a control flow diagram showing a control sequence executed among various nodes within multiple IP networks including the mobile network in accordance with embodiment 1 of the present invention.

Therefore, when each of the plurality of IP tunnel routers 10*a* to 10*c* updates the tunnel processing information file, each of the plurality of IP tunnel routers 10*a* to 10*c* can transfer IP packets to the mobile terminal 3 that has caused the updating of the tunnel processing information file by using an IP tunnel. Assume that the CN 7 issues IP packets destined for the mobile terminal 3 (see FIGS. 2 and 3) as the mobile terminal 3 accesses the CN 7 connected to the Internet (i.e., the IP network 1*b*), as shown in FIG. 3, or that the CN 7 voluntarily transmits IP packets to the mobile terminal 3 without responding to such an access or a request for transmission of data.

The IP packets destined for the mobile terminal 3 and sent from the CN 7 are received by the IP tunnel router 10*c* by way of the network gateway 2. The IP tunnel router 10*c* refers to the destination address included in the header of each IP packet, recognizes that this destination address is described in the destination address field of the tunnel processing information file, and encapsulates (designated by reference character CUP shown in FIG. 3) each IP packet, and transfers the encapsulated IP packets to the FA 5*a*. Reference numeral 12 shown in FIG. 2 denotes a virtual IP tunnel extending from the IP tunnel router 10*c* to the FA 5*a*. Thus, each of the plurality of IP tunnel routers 10*a* to 10*c* included in the IP network 1*a* can transfer IP packets sent from the CN 7 to the subnet where the mobile terminal 3 currently exists by way of the IP tunnel 12 based on the IP tunnel setting information without making them go through the HA server 9.

The FA 5*a* then decapsulates (designated by reference character DEC shown in FIG. 3) the encapsulated IP packets into IP packets in their original format, and delivers the decapsulated IP packets to the mobile terminal 3 by using an identifier effective in the subnet associated therewith.

In accordance with this embodiment, the mobile terminal 3 can transmit IP packets to the CN 7 by using a method of transmitting IP packets by way of a normal routing path.

Figure 5:
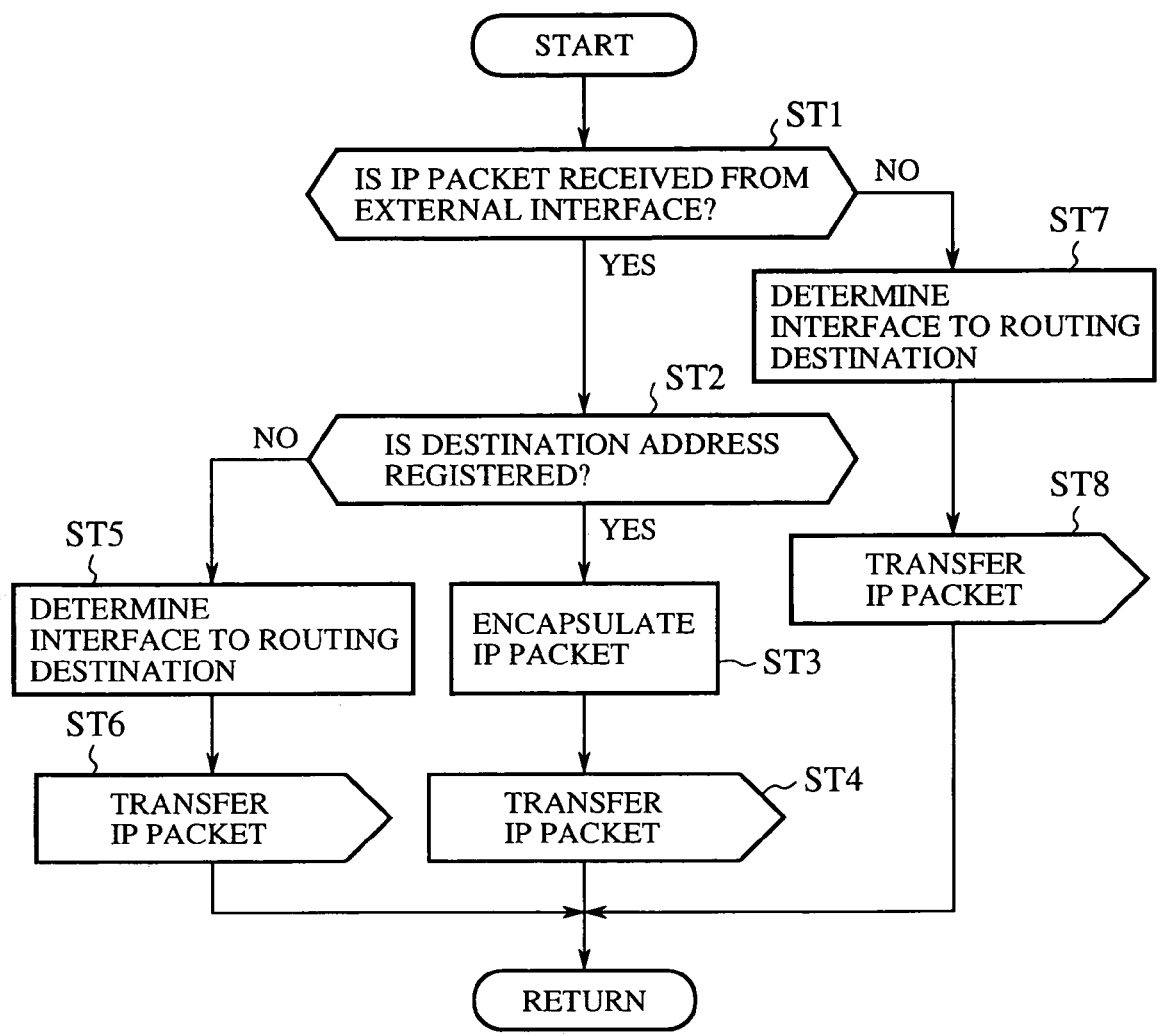
FIG. 5 is a flow chart showing an operation of each IP tunnel router of the mobile network in accordance with embodiment 1 of the present invention when receiving IP packets.

FIG. 5 is a flow chart showing the operation of each of the plurality of IP tunnel routers 10*a* to 10*c* in accordance with the embodiment 1. Each of the plurality of IP tunnel routers 10*a* to 10*c* starts this operation as a sub routine when receiving IP packets.

When receiving an IP packet, each of the plurality of IP tunnel routers 10*a* to 10*c* determines whether it has received the IP packet from an external interface (e.g., the network gateway 2, or the FA 5*a* or 5*b*) as shown in step ST1. Reception of an IP packet from an external interface means that there is a sending source node outside the subnet where the plurality of IP tunnel routers exist. When each of the plurality of IP tunnel routers 10*a* to 10*c* determines that it has received no IP packet from any external interface, it can be assumed that each of the plurality of IP tunnel routers 10*a* to 10*c* has received an IP packet from an internal interface (e.g., the router 11*a* or 11*b*), that is, there is a sending source node within the subnet where each of the plurality of IP tunnel routers 10*a* to 10*c* is installed.

When receiving an IP packet from an external interface, each of the plurality of IP tunnel routers 10*a* to 10*c*, in step ST2, refers to the destination address included in the header of the received IP packet, and determines whether or not this destination address is described in the destination address field of the tunnel processing information file registered therein. In other words, each of the plurality of IP tunnel routers 10*a* to 10*c* determines whether or not the mobile terminal that is the destination is obtaining service provided by a subnet other than the subnet where each of the plurality of IP tunnel routers 10*a* to 10*c* is installed.

When determining that the destination address is described in the destination address field in step ST2, each of the plurality of IP tunnel routers 10*a* to 10*c* encapsulates the received IP packet as mentioned above (in step ST3), and, after that, transfers the encapsulated IP packet to the FA associated with the encapsulated destination address (in step ST4). Therefore, the FA can deliver the IP packet to the mobile terminal that is the destination located in the subnet associated therewith and placed outside the IP network 1*a*.

On the other hand, when determining that no destination address is described in the destination address field in step ST2 (i.e., when the mobile terminal that is the destination stays in the subnet where each of the plurality of IP tunnel routers 10a to 10c is installed), each of the plurality of IP tunnel routers determines an internal interface (e.g., the router 11a or 11b) that is the routing destination of the received IP packet (in step ST5), and, after that, transfers the IP packet to the internal interface (in step ST6). Therefore, the IP packet is delivered from the internal interface to the mobile terminal that is the destination and currently exists in the subnet corresponding to the IP network 1a.

In addition, each of the plurality of IP tunnel routers 10a to 10c advances to step ST7 when determining that it has not received any IP packet from an external interface, in step ST1. In other words, when each of the plurality of IP tunnel routers 10a to 10c has received an IP packet from an internal interface, each of the plurality of IP tunnel routers 10a to 10c determines an interface that is the routing destination of the received IP packet (in step ST7), and, after that, transfers the IP packet to the interface (in step ST8).

As mentioned above, in accordance with this embodiment 1, because each of the plurality of IP tunnel routers 10a to 10c transfers IP packets to the mobile terminal 3 located outside the IP network 1a without making them go through the HA server 9, the traffic carried by and load imposed on the HA server 9 can be reduced. Therefore, the mobile network can prevent the occurrence of a bottleneck point and can implement communications more smoothly as compared with prior art mobile networks, thereby improving the scalability of the multiple IP networks. Furthermore, even if trouble occurs in the HA server 9 or either of the plurality of IP tunnel routers 10a to 10c, because transfer of IP packets can be implemented by using other nodes without troubles, the mobile IP network will have a large tolerance to troubles. Furthermore, because each of the plurality of IP tunnel routers 10a to 10c located on the edge of the network can carry out the tunnel processing, optimum routing can be implemented within the home network.

The mobile network of embodiment 1 operates, as mentioned above, according to the mobile IP of IPv4 (Internet Protocol version 4). As an alternative, the mobile network of embodiment 1 can be so constructed as to operate according to the mobile IP of IPv6 (Internet Protocol version 6). While IP packets are transmitted from a subnet to which a mobile terminal originally belongs to the mobile terminal that has moved to an outside subnet by way of an FA according to IPv4, a temporary, global address (i.e., an address effective in any subnet) is given to a mobile terminal that has moved to an outside subnet according to IPv6 and IP packets are then transmitted to the mobile terminal with the temporary, global address without being passed through any FA.

In a variant of this embodiment in which a mobile network operates according to the mobile IP of IPv6, the temporary, global address of the mobile terminal (e.g., the mobile terminal 3) is notified to the HA server 9 of the virtual HA 8 which the mobile terminal originally joins, and is further notified to the plurality of IP tunnel routers 10a to 10c. When receiving an IP packet destined for the mobile terminal, each of the plurality of IP tunnel routers 10a to 10c encapsulates the IP packet and transfers it directly to the mobile terminal. In other words, each of the plurality of IP tunnel routers 10a to 10c establishes an IP tunnel between itself and the mobile terminal that is the destination of the IP packet. In this case, the encapsulated destination address is the temporary, global address of the mobile terminal. After that, when a direct connection is established between the sending source node (e.g., the CN 7) and the mobile terminal, IP packets are transmitted directly to the mobile terminal from the sending source node. Mobile networks in accordance with other embodiments described later can operate according to IPv6.

As previously mentioned, in accordance with this embodiment 1 of the present invention, the mobile network uses one virtual HA. The mobile network can use an MAP (Mobility Anchor Point) instead of one virtual HA. The MAP is a virtual home agent being adopted into DRiVE (Dynamic Radio for IP-Services in Vehicular Environments) and HMIPv6 (Hierarchical Mobile IPv6). A plurality of MAPs are disposed in one core network. In this variant, the functionality of each MAP is spread over one HA server and a plurality of IP tunnel routers.

Embodiment 2

Figure 6:
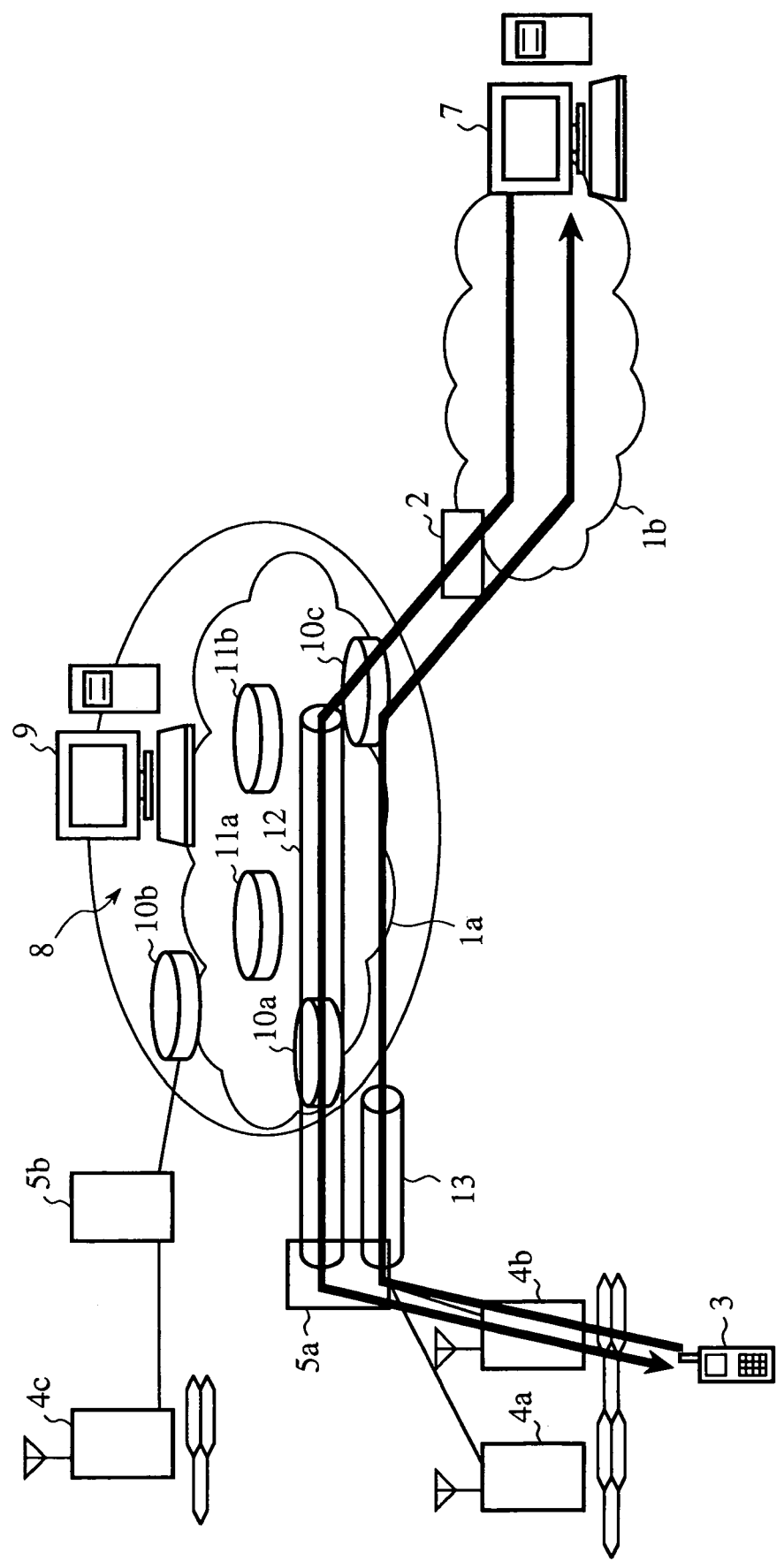
FIG. 6 is a diagrammatic view showing a flow of user IP packets in a mobile network in accordance with embodiment 2 of the present invention, to which a reverse tunneling is applied.

FIG. 6 shows a flow of user data between a mobile terminal 3 and a CN 7 in a mobile network in accordance with embodiment 2 of the present invention. The mobile network in accordance with embodiment 2 of the present invention and entire multiple IP networks can be the same as those as shown in FIG. 1. An HA server 9, a plurality of IP tunnel routers 10a to 10c, FAs 5a and 5b have additional functions described later, respectively.

In FIG. 6, reference numeral 13 denotes a virtual reverse IP tunnel extending from the FA 5a to the IP tunnel router 10a. In accordance with this embodiment 2, during backward-direction communications from the mobile terminal 3 to the CN 7, the reverse IP tunnel 13 via which encapsulated IP packets are transmitted is used as a route from an FA (e.g., the FA 5a) to an IP tunnel router (e.g., the IP tunnel router 10a). Other operations, i.e., forward-direction communications from the CN7 to the mobile terminal 3 are conducted in the same way as explained in Embodiment 1.

Next, a description will be made as to an operation of the mobile network in accordance with embodiment 2 of the present invention. In accordance with this embodiment, when the mobile terminal 3 detects that the mobile terminal 3 has moved from another area that is under the charge of an old FA or a virtual HA 8 to an area that is under the charge of a subnet associated with a new FA (e.g., the FA 5a), the mobile terminal 3 transmits a regional registration message that complies with the mobile IP to the FA 5a. Then, the FA 5a assigns an identifier effective in the subnet associated therewith to the mobile terminal 3 by carrying out internal processing, and transmits a second regional registration message to the HA server 9 (see FIG. 3), like that of above-mentioned embodiment 1.

When receiving the second regional registration message, the HA server 9 updates registered information about the mobile terminal 3 stored in a storage unit thereof according to this second regional registration message. The HA server 9 then delivers IP tunnel setting information indicating the mobile terminal 3 and the subnet from which the mobile terminal 3 newly obtains service to all of the plurality of IP tunnel routers 10a to 10c located on the edge of the IP network 1a to which the HA server 9 belongs.

The IP tunnel setting information indicates the home address of the mobile terminal 3 and an. IP address (i.e., a care-of address) specifying the FA 5a, like that as mentioned in Embodiment 1. Therefore, each of the plurality of IP tunnel routers 10a to 10c recognizes that the mobile terminal 3 can obtain service provided by the FA 5a. When receiving this IP tunnel setting information, each of the plurality of IP tunnel routers 10a to 10c updates (designated by reference character ET shown in FIG. 3) a tunnel processing information file stored in a storage unit thereof according to the IP tunnel setting information.

The tunnel processing information file in accordance with this embodiment has information used for decapsulation as shown in FIG. 7 in addition to the information used for encapsulation as mentioned in Embodiment 1 and as shown in the FIG. 4. When updating the tunnel processing information file, each of the plurality of IP tunnel routers 10a to 10c updates the information used for encapsulation as shown in FIG. 4 and further updates the information used for decapsulation as shown in FIG. 7.

The tunnel processing information file has fields in which a destination address, processing, an encapsulated destination address, and an encapsulated sending source address are described, as shown in FIG. 7. However, the fields representing the encapsulated destination address and the encapsulated sending source address are not used for decapsulation.

The IP address of the HA server 9 is described as the destination address. As an alternative, the IP address of either of the plurality of IP tunnel routers 10a, 10b and 10c can be described as the destination address. The IP address (i.e., the care-of address) of the FA that has transmitted the above-mentioned second regional registration message is described as the sending source address. "Decapsulation" is described as the nature of the processing.

On the other hand, when receiving an IP packet destined for a destination that exists in an outside subnet, each FA encapsulates the IP packet. Concretely, each FA uses the IP address (i.e., the care-of address) thereof as the encapsulated sending source address, and provides an IP packet header that uses the IP address of the HA server 9 or either of the plurality of IP tunnel routers 10a to 10c as the encapsulated destination address to the received IP packet so as to generate an encapsulated IP packet. The FA then transmits the encapsulated IP packet to the encapsulated destination address by using the reverse IP tunnel 13. From another point of view, the IP packet having, as the sending source address, the care-of address in the IP header and, as the destination address, the IP address of the HA server 9 or either of the plurality of IP tunnel routers 10a to 10c is an encapsulated IP packet.

Each of the plurality of IP tunnel routers 10a to 10c can refer to the packet header of each IP packet received from an external interface (e.g., the network gateway 2 or the FA 5a or 5b), and can determine whether the destination address described in this packet header is the IP address of the HA server 9 or either of the plurality of IP tunnel routers 10a to 10c. As an alternative, each of the plurality of IP tunnel routers 10a to 10c can determine whether or not the sending source address described in the packet header of each IP packet received from the external interface is a care-of address. Because each received IP packet is an encapsulated IP packet when determined in the affirmative in either of those determination processes, each of the plurality of IP tunnel routers 10a to 10c decapsulates this IP packet.

In other words, the destination address field and sending source address field of the tunnel processing information file as shown in FIG. 7 define conditions under which each of the plurality of IP tunnel routers 10a to 10c carries out the decapsulation processing on each encapsulated IP packet received by way of the reverse IP tunnel 13. After that, each of the plurality of IP tunnel routers 10a to 10c retrieves the original IP packet from each encapsulated IP packet (i.e., decapsulates each encapsulated IP packet), and transfers the original IP packet to the destination address indicated by the packet header of the original IP packet.

Figure 8:
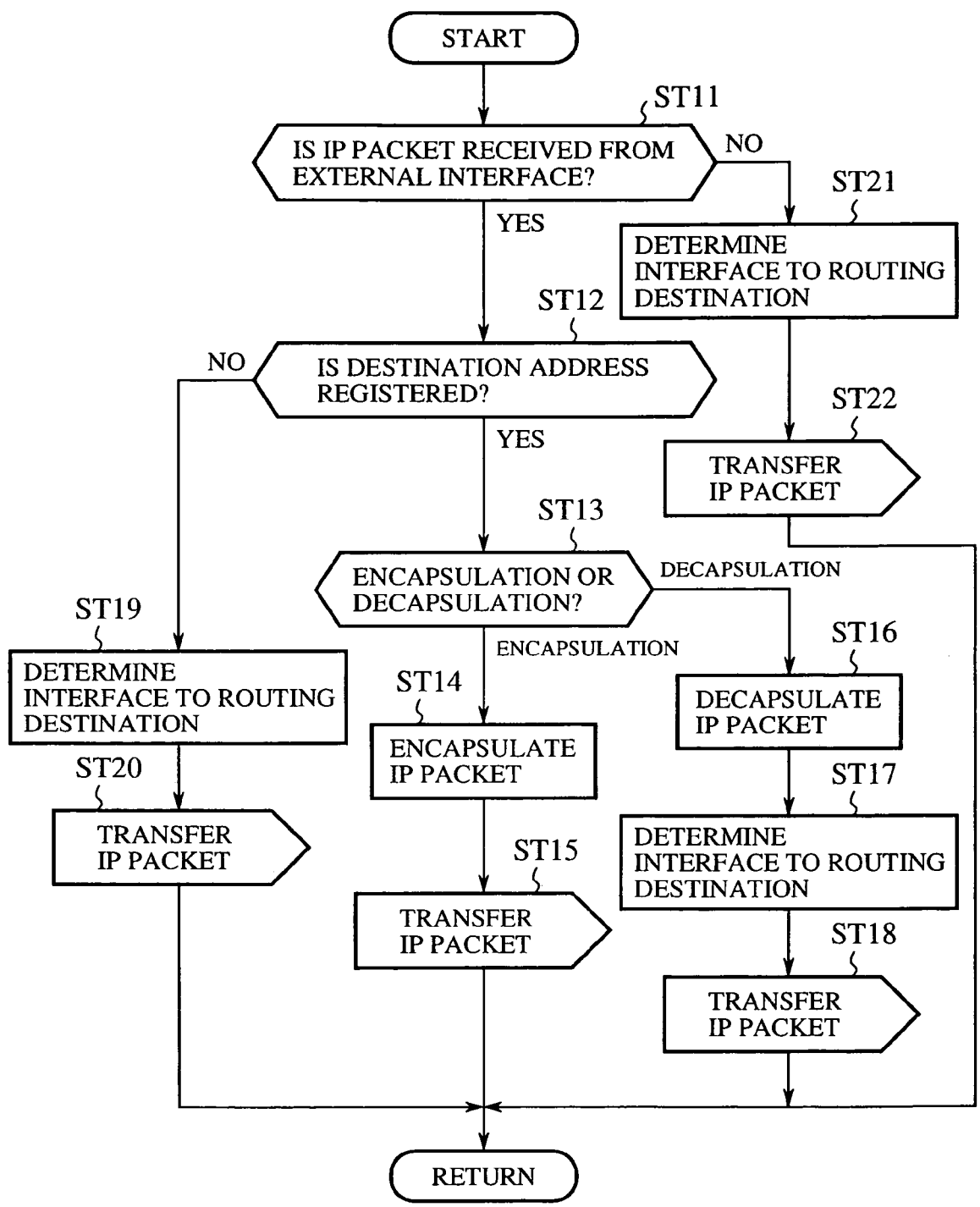
FIG. 8 is a flow chart showing an operation of each IP tunnel router of the mobile network in accordance with embodiment 2 of the present invention when receiving IP packets.

FIG. 8 is a flow chart showing the operation of each of the plurality of IP tunnel routers 10a to 10c in accordance with embodiment 2. Each of the plurality of IP tunnel routers 10a to 10c starts this operation as a sub routine when receiving IP packets.

When receiving an IP packet, each of the plurality of IP tunnel routers 10a to 10c determines whether it has received the IP packet from an external interface (e.g., the network gateway 2, or the FA 5a or 5b) as shown in step ST1. Reception of IP packets from an external interface means that there is a sending source node outside the subnet where each of the plurality of IP tunnel routers is installed. When each of the plurality of IP tunnel routers 10a to 10c determines that it has received no IP packet from any external interface, it can be assumed that each of the plurality of IP tunnel routers 10a to 10c has received an IP packet from an internal interface (e.g., the router 11a or 11b), that is, there is a sending source node within the subnet where each of the plurality of IP tunnel routers is installed.

When receiving an IP packet from an external interface, each of the plurality of IP tunnel routers 10a to 10c, in step ST2, refers to the destination address included in the header of the received IP packet, and determines whether or not this destination address is described in the destination address field of the tunnel processing information file registered therein.

When determined in the affirmative in step ST12, it can be assumed that the mobile terminal that is the destination obtains service provided in a subnet other than the subnet in which each of the plurality of IP tunnel routers is installed (see FIG. 4) or each of the plurality of IP tunnel routers receives the IP packet from the reverse IP tunnel 13 (see FIG. 7). In either case, each of the plurality of IP tunnel routers advances to step ST13 when determined, in step ST12, in the affirmative. Each of the plurality of IP tunnel routers then, in step ST13, determines whether "encapsulation" or "decapsulation" is described as the nature of the processing associated with the destination address included in the tunnel processing information file.

When the nature of the processing is "encapsulation", the mobile terminal that is the destination obtains service provided by a subnet other than the subnet in which each of the plurality of IP tunnel routers is installed. In this case, each of the plurality of IP tunnel routers advances to step ST14 in which each of the plurality of IP tunnel routers encapsulates the received IP packet as mentioned above, and, after that, transfers the encapsulated IP packet to an FA associated with the encapsulated destination address (in step ST15). Therefore, the received IP packet can be delivered to the mobile terminal that is the destination existing in a subnet located outside the IP network 1a by the FA.

On the other hand, when the nature of the processing is "Decapsulation", it can be assumed that each of the plurality of IP tunnel routers has received the IP packet by way of the reverse IP tunnel 13. In this case, each of the plurality of IP tunnel routers then advances to step ST16 in which each of the plurality of IP tunnel routers decapsulates the received IP packet (i.e., the encapsulated IP packet), as mentioned above, and each of the plurality of IP tunnel routers determines an interface that is the routing destination of the retrieved IP packet (in step ST17), and, after that, transfers the retrieved IP packet to the interface (in step ST21). Thus, IP packets can be delivered from the interface to the CN 7 connected to the IP network 1b.

On the other hand, when determined, in step ST12, in the negative (i.e., when the mobile terminal that is the destination is still staying in the subnet in which each of the plurality of IP tunnel routers is installed), each of the plurality of IP tunnel routers determines an internal interface (e.g., the router 11a or 11b) that is the routing destination of the received IP packet (in step ST19), and, after that, transfers the received IP packet to the internal interface (in step ST20). Thus, received IP packets can be delivered from the internal interface to the mobile terminal that is the destination which currently exists in the IP network 1a.

In addition, each of the plurality of IP tunnel routers advances to step ST21 when determined, in step ST11, in the negative. In other words, when receiving an IP packet from an internal interface, each of the plurality of IP tunnel routers determines an interface that is the routing destination of the received IP packet (in step ST21), and, after that, transfers the IP packet to the interface (in step ST22).

As mentioned above, in accordance with this embodiment 2, during backward-direction communications from the mobile terminal 3 to the CN 7, the mobile network uses the reverse IP tunnel 13 via which encapsulated IP packets are transmitted as a route from an FA (e.g., the FA 5a) to an IP tunnel router (e.g., the IP tunnel router 10a). Therefore, the mobile IP becomes applicable in the network in which backward-direction IP packet communications from the mobile terminal 3 to the CN 7 cause an access violation at an IP address.

Embodiment 3

Figure 9:
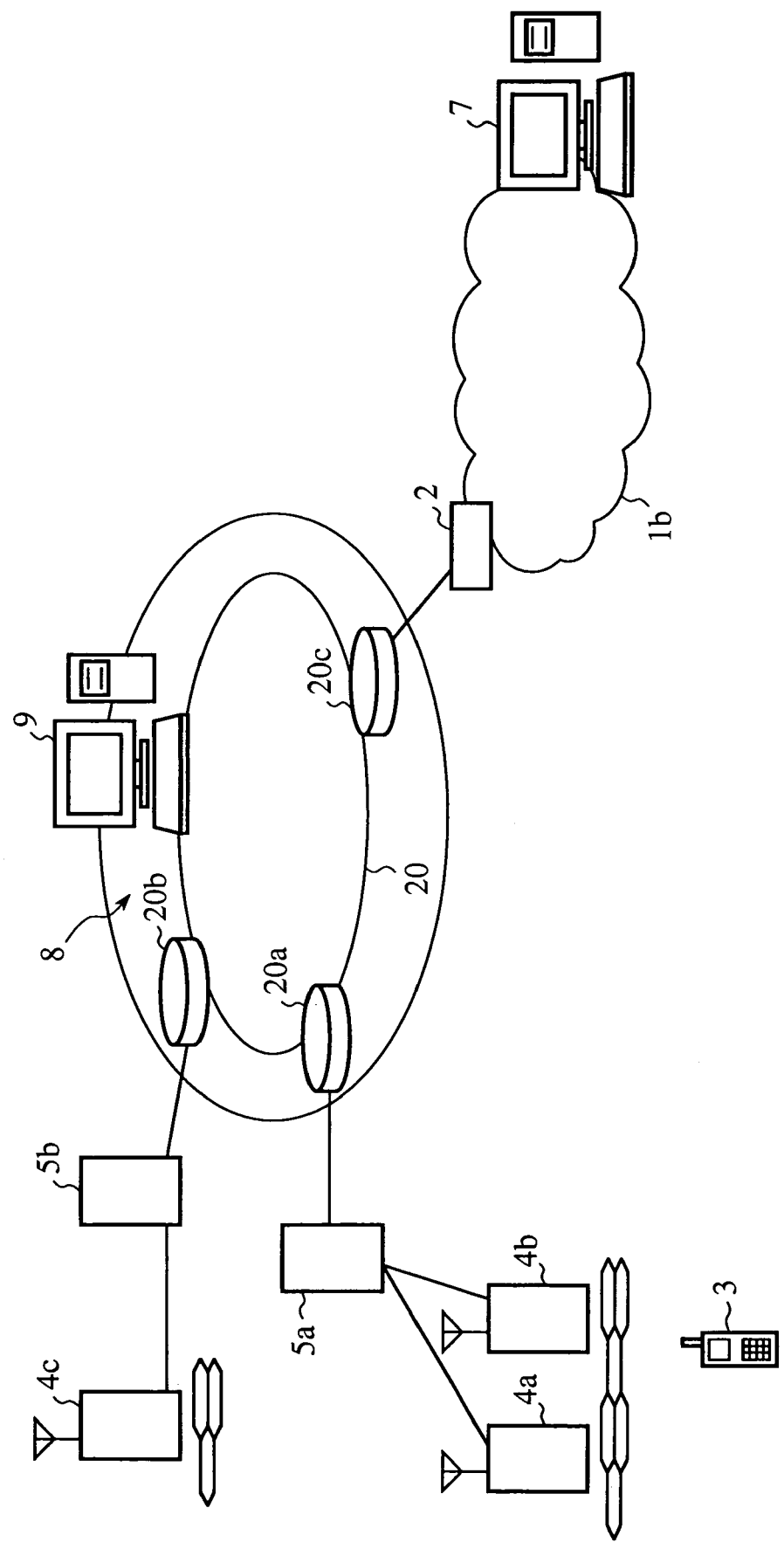
FIG. 9 is a diagrammatic view showing the structure of a mobile network in accordance with embodiment 3 of the present invention.

FIG. 9 shows multiple IP networks having a mobile network in accordance with embodiment 3 of the present invention. In the figure, reference numeral 20 denotes an MPLS (MultiProtocol Label Switching) network, and reference numerals 20a to 20c denote IP tunnel routers.

In the multiple IP networks of FIG. 9, the IP network 1a of FIG. 1 is replaced by the MPLS network 20, and the plurality of IP tunnel routers 10a to 10c are replaced by the plurality of IP tunnel routers 20a to 20c. Other nodes are the same as those as shown in FIG. 1. A virtual HA 8 is provided with an HA server 9 and the plurality of IP tunnel routers 20a to 20c.

Next, a description will be made as to an operation of the mobile network in accordance with embodiment 3 of the present invention. Basically, each node as shown in FIG. 9 operates in the same way that a corresponding node of above-mentioned embodiment 1 or 2 does. In addition, in order to ensure QoS (Quality of Service) in the home network (i.e., the MPLS network 20), each of the plurality of IP tunnel routers 20a to 20c has an MPLS edge function.

Mobile terminals joining the MPLS network 20, which is their home network, and including a mobile terminal (e.g., a mobile terminal 3) that has moved to another subnet that partially constitutes the multiple IP networks can transmit a request regarding QoS to the HA server 9. When moving to another subnet, for example, the mobile terminal can incorporate this QoS request into a regional registration message that complies with the mobile IP. In this case, an FA (e.g., an FA 5a) belonging to the other subnet transmits a second regional registration message specifying a QoS request to the HA server 9. As an alternative, each mobile terminal can transmit a QoS request to the HA server 9 according to RSVP (Resource Reservation Protocol) in a timely manner.

When accepting such a QoS request, the HA server 9 updates registered information about the mobile terminal 3, which is stored in a storage unit thereof, according to the QoS request. Furthermore, the HA server 9 delivers QoS information (i.e., service quality information) indicating the QoS request made by the mobile terminal 3 to all of the plurality of IP tunnel routers 20a to 20c included in the MPLS network 20 associated with the HA server 9. When the QoS request is included in the regional registration message, the QoS information can be included in IP tunnel setting information. A traffic class, priority, an insured band, a maximum band, an insured time delay, or the like can be set as the QoS information.

Therefore, the HA server 9 and each of the plurality of IP tunnel routers 20a to 20c can interpret or recognize the QoS request made by the mobile terminal 3. When receiving the QoS information, each of the plurality of IP tunnel routers 20a to 20c updates a tunnel processing information file stored in a storage unit thereof according to this QoS information. In other words, each of the plurality of IP tunnel routers 20a to 20c interprets the newly specified QoS information, and maps a QoS insuring function (e.g., an MPLS label path) associated with the QoS information to the tunnel processing information file (see FIGS. 4 and 7).

When receiving an IP packet destined for the mobile terminal 3, each of the plurality of IP tunnel routers 20a to 20c transfers the IP packet based on the QoS insuring function described in the tunnel processing information file. Even when receiving an IP packet to be transmitted from the mobile terminal 3 to a CN 7, each of the plurality of IP tunnel routers 20a to 20c can also transfer the IP packet based on the QoS insuring function.

As mentioned above, in accordance with this embodiment 3, the mobile network can set an IP tunnel flow in consideration of QoS. The function of insuring QoS in the home network is not limited to MPLS used in this embodiment. Another appropriate QoS insuring function such as DiffServ (Differentiated Services) can be used. Such a change falls within the scope of the present invention.

Embodiment 4

Figure 10:
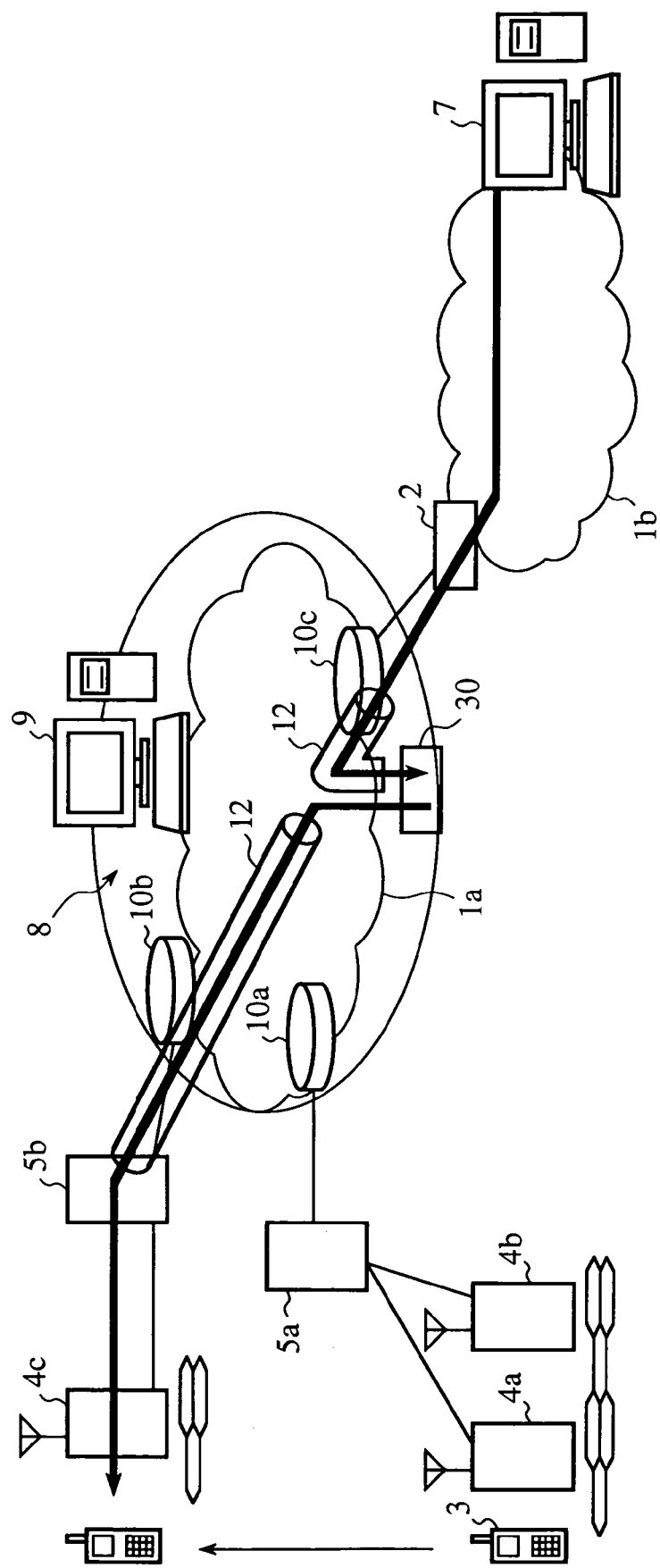
FIG. 10 is a diagrammatic view showing the structure of a mobile network in accordance with embodiment 4 of the present invention.

FIG. 10 shows a mobile network in accordance with embodiment 4 of the present invention. In the figure, reference numeral 30 denotes a buffering server (i.e., a buffer). This buffering server 30 is disposed for a handoff of each mobile terminal, and temporarily stores encapsulated IP packets destined for mobile terminals. An IP network 1a has the buffering server 30 in addition to an HA server 9 and a plurality of IP tunnel routers 10a to 10c. Other nodes are the same as those as shown in FIG. 1.

Figure 11:
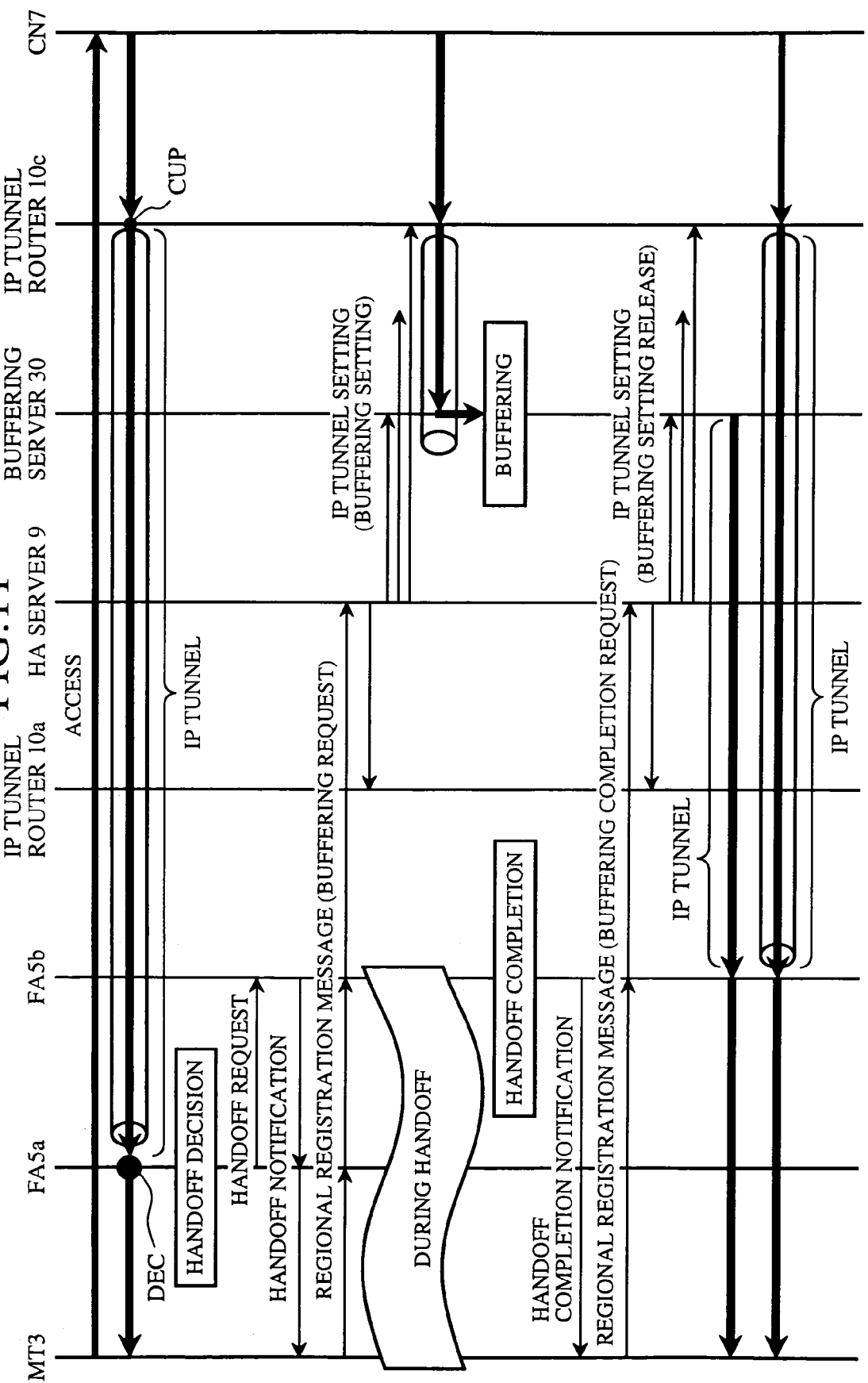
FIG. 11 is a control flow diagram showing a control sequence executed among various nodes within multiple IP networks including the mobile network in accordance with embodiment 4 of the present invention.

Next, a description will be made as to an operation of the mobile network in accordance with embodiment 4 of the present invention. The following explanation will be made with reference to FIG. 11 showing a control flow diagram of a sequence of control executed among various nodes in the multiple IP networks including the mobile network in accordance with embodiment 4. First, assume that a mobile terminal (MT) 3 registers the IP address (i.e., the care-of address) of an FA 5a in an HA server 9 as the location thereof, and an IP tunnel 12 extending from an IP tunnel router 10c to the FA 5a is established. Therefore, at an initial stage as shown in FIGS. 2 and 3, IP packets transmitted from a CN 7 to the mobile terminal (MT) 3 are transferred from the IP tunnel router 10c to the FA 5a by way of the IP tunnel 12. After that, they are transferred from the FA 5a to the mobile terminal 3.

Here, it is further assumed that the mobile terminal 3 moves from a subnet to which the FA 5a belongs to another subnet to which another FA 5b belongs. The FA 5a decides a handoff by detecting the location of the mobile terminal 3, and transmits a handoff request to the FA 5b in the vicinity of the mobile terminal 3. When receiving the handoff request, the FA 5b sends a handoff notification back to the FA 5a, and the FA 5a then transfers the handoff notification to the mobile terminal 3.

The mobile terminal 3 transmits a regional registration message to the FA 5a in response to the handoff notification. A buffering request described later, as well as the home address of the mobile terminal 3, is indicated by the regional registration message. The regional registration message is finally delivered to the HA server 9 by way of the FAs 5a and 5b. In order to prevent IP packets addressed to the mobile terminal 3 from being lost during the handoff, the buffering request is made for additional use of the buffering server 30.

Therefore, the HA server 9 recognizes that it should use the buffering server 30 in order to transmit IP packets to the mobile terminal 3. Instead of the use of the regional registration message indicating the buffering request, the HA server 9 can recognize that it should use the buffering server 30 by using another method. For example, the HA server 9 can determine that it should use the buffering server 30 based on either QoS information that has been obtained by negotiating with the mobile terminal 3 in advance by using a procedure defined by such a protocol as RSVP, or DSCP information about DiffServ.

When recognizing that it is necessary to use the buffering server 30, the HA server 9 delivers buffering setting information to both all of the plurality of IP tunnel routers 10a to 10c located in the IP network 1a to which the HA server 9 belongs and the buffering server 30. The HA server 9 can perform the transmission of this buffering setting information at the same time when the HA server performs the transmission of the IP tunnel setting information as explained in Embodiment 1.

When receiving the buffering setting information, each of the plurality of IP tunnel routers 10a to 10c recognizes that the IP tunnel 12, which is one of routes extending to the mobile terminal 3 that is the destination, is terminated at the buffering server 30. Therefore, each of the plurality of IP tunnel routers 10a to 10c does not select the care-of address of the FA 5a but selects the IP address of the buffering server 30, as the encapsulated destination address, for IP packets destined for the mobile terminal 3.

When receiving the buffering setting information, the buffering server 30 becomes to be able to store encapsulated IP packets associated with the buffering setting information. In other words, the IP tunnel 12 extending from the IP tunnel router 10c to the FA 5a is changed to the one extending from the IP tunnel router 10c to the buffering server 30.

Therefore, when an IP packet destined for the mobile terminal 3 is newly transmitted from a node (e.g., the CN 7) located outside the IP network 1a, the IP tunnel router 10c encapsulates the IP packet and transmits the encapsulated IP packet to the buffering server 30, and the buffering server 30 stores the encapsulated IP packet therein. On the other hand, the mobile terminal 3 and the FAs 5a and 5b carry out various negotiations for the handoff with one another and setting of communication conditions.

When the handoff is finished completely, the FA 5b that is newly used by the mobile terminal transmits a handoff completion notification to the mobile terminal 3. The mobile terminal 3 that has accepted the handoff completion notification transmits a regional registration message to the FA 5b. A buffering completion request, as well as the home address of the mobile terminal 3, is indicated by this regional registration message. The home address of the mobile terminal 3 is included in this regional registration message, and the FA 5b therefore assigns an identifier effective in a subnet associated therewith to the home address of the mobile terminal 3 by carrying out internal processing, and transmits a regional registration message of another type (i.e., a second regional registration message) to the HA server 9. This second regional registration message indicates the home address of the mobile terminal 3 and an IP address (i.e., a care-of address) indicating the FA 5b, and also indicates the buffering completion request. Therefore, the HA server 9 recognizes that the mobile terminal 3 can newly obtain service provided by the FA 5b, and it is already unnecessary to use the buffering server 30 in order to transmit IP packets to the mobile terminal 3.

When receiving the second regional registration message, the HA server 9 updates registered information about the mobile terminal 3 stored in a storage unit thereof according to this second regional registration message. Furthermore, the HA server 9 delivers the IP tunnel setting information indicating the mobile terminal 3 and the subnet from which the mobile terminal 3 newly receives service to both all of the plurality of IP tunnel routers 10a to 10c included in the IP network 1a, to which the HA server 9 belongs, and the buffering server 30. Buffering setting release information is indicated by this IP tunnel setting information.

When receiving the buffering setting release information, the buffering server 30 reads an encapsulated IP packet stored therein and associated with the buffering setting release information, and then delivers them to the new FA 5b. In other words, the mobile network newly and temporarily establishes the IP tunnel 12 extending from the buffering server 30 to the new FA 5b.

Furthermore, when receiving the buffering setting release information, each of the plurality of IP tunnel routers 10a to 10c recognizes that the IP tunnel 12, which is one of routes extending to the mobile terminal 3 that is the destination, is not terminated at the buffering server 30 any longer but is terminated at the FA 5b that is newly used by the mobile terminal. Therefore, each of the plurality of IP tunnel routers 10a to 10c does not select the IP address of the buffering server 30 but selects the care-of address of the FA 5a, as the encapsulated destination address, for IP packets destined for the mobile terminal 3.

Therefore, when an IP packet destined for the mobile terminal 3 is newly transmitted from a node (e.g., the CN 7) located outside the IP network 1a, the IP tunnel router 10c encapsulates the IP packet and transmits the encapsulated IP packet to the FA 5b, and the FA 5b retrieves the original IP packet from the encapsulated IP packet and then delivers the original IP packet to the mobile terminal 3.

As mentioned above, in accordance with this embodiment 4, the proper use of the buffering server 30 installed in the IP network 1a makes it possible to apply the mobile IP to a communication environment in which any loss of IP packets is not permitted.

In accordance with embodiment 4, instead of the single buffering server 30 installed in the IP network 1a, a buffer having a similar function can be installed in each of the plurality of IP tunnel routers 10a to 10c. In this case, when receiving the buffering setting information, each of the plurality of IP tunnel routers stores encapsulated IP packets in its own buffer, and, when receiving the buffering setting release information, transmits the encapsulated IP packets stored in the buffer to the new FA.

Embodiment 5

Figure 12:
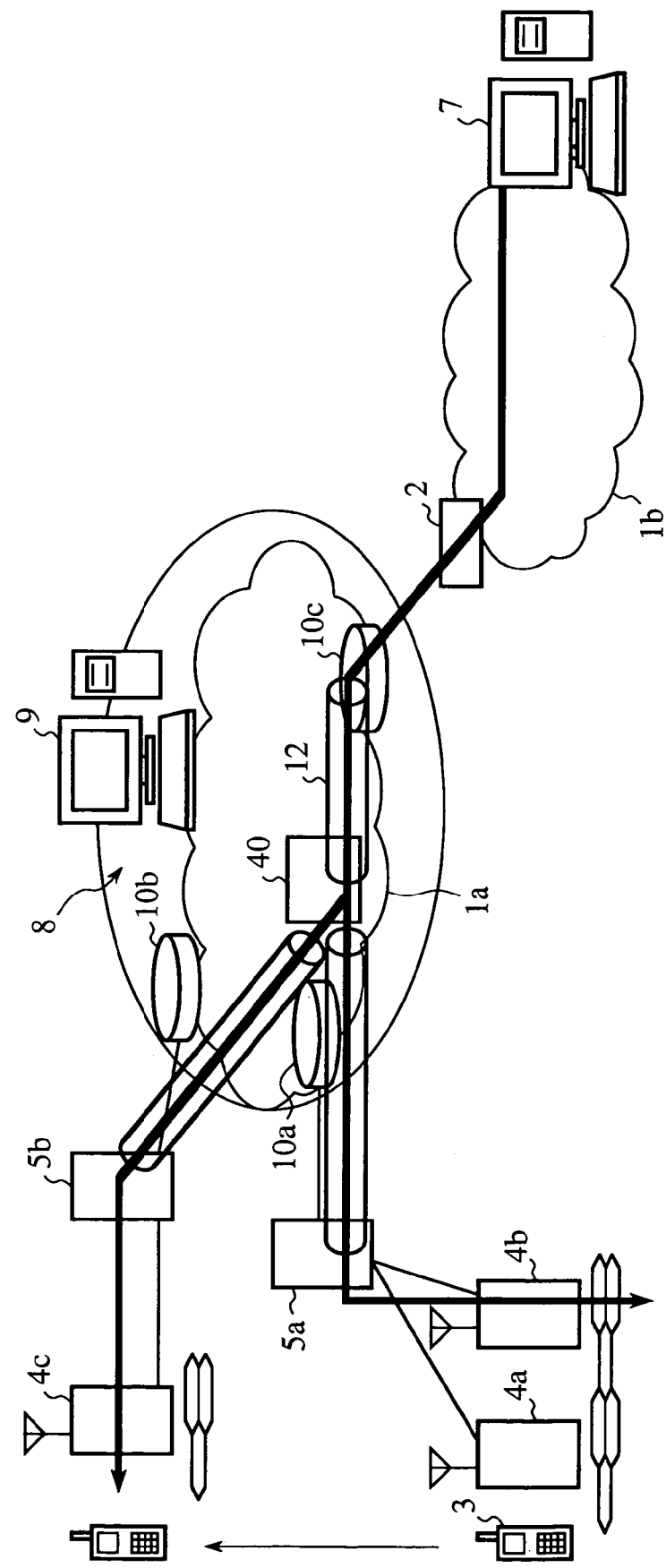
FIG. 12 is a outline drawing showing the structure of a mobile network in accordance with embodiment 5 of the present invention.

FIG. 12 shows a mobile network in accordance with embodiment 5 of the present invention. In the figure, reference numeral 40 denotes a bicasting server (i.e., a bicasting unit). This bicasting server 40 is disposed for a handoff of each mobile terminal. When receiving an encapsulated IP packet destined for a mobile terminal, the bicasting server 40 creates a copy of the IP packet and transmits (i.e., bicasts) the encapsulated IP packet destined for the mobile terminal to two FAs which are used before and after a handoff of the mobile terminal. An IP network 1a has the bicasting server 40 in addition to an HA server 9 and a plurality of IP tunnel routers 10a to 10c. Other nodes are the same as those as shown in FIG. 1.

Figure 13:
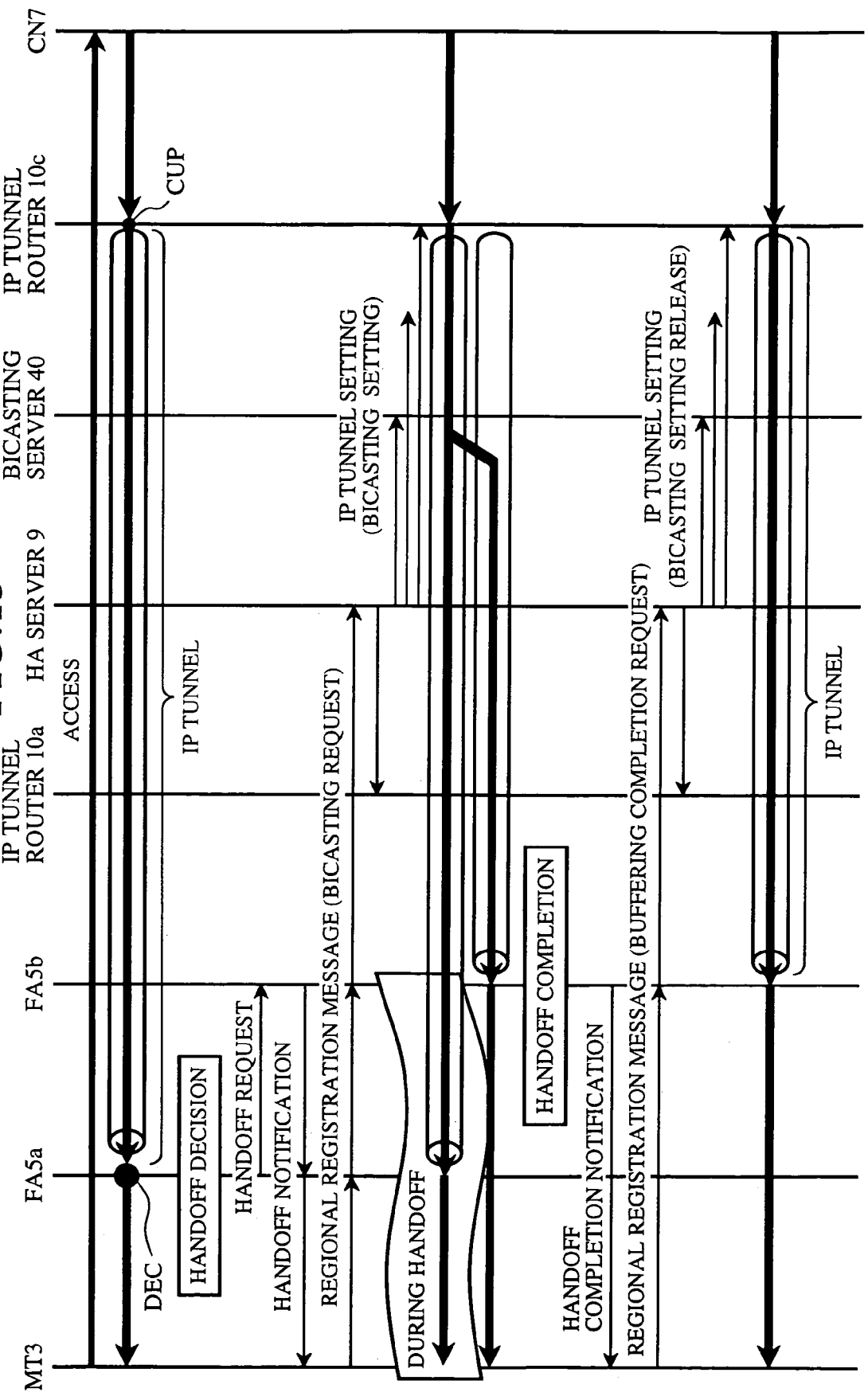
FIG. 13 is a control flow diagram showing a control sequence executed among various nodes within multiple IP networks including the mobile network in accordance with embodiment 5 of the present invention.

Next, a description will be made as to an operation of the mobile network in accordance with embodiment 5 of the present invention. The following explanation will be made with reference to FIG. 13 showing a control flow diagram of a sequence of control executed among various nodes in the multiple IP networks including the mobile network in accordance with embodiment 5. First, assume that a mobile terminal (MT) 3 registers the IP address (i.e., the care-of address) of an FA 5a in an HA server 9 as the location thereof, and an IP tunnel 12 extending from an IP tunnel router 10c to the FA 5a is established. Therefore, at an initial stage as shown in FIGS. 2 and 3, IP packets transmitted from a CN 7 to the mobile terminal (MT) 3 are transferred from the IP tunnel router 10c to the FA 5a by way of the IP tunnel 12. After that, they are transferred from the FA 5a to the mobile terminal 3.

Here, it is further assumed that the mobile terminal 3 moves from a subnet to which the FA 5a belongs to another subnet to which an FA 5b belongs. The FA 5a decides a handoff by detecting the location of the mobile terminal 3, and transmits a handoff request to the FA 5b in the vicinity of the mobile terminal 3. When receiving the handoff request, the FA 5b sends a handoff notification back to the FA 5a, and the FA 5a then transfers the handoff notification to the mobile terminal 3.

The mobile terminal 3 transmits a regional registration message to the FA 5a in response to the handoff notification. A bicasting request described later, as well as the home address of the mobile terminal 3, is indicated by the regional registration message. The regional registration message is finally delivered to the HA server 9 by way of the FAs 5a and 5b. In order for IP packets addressed to the mobile terminal 3 to be transferred to the mobile terminal 3 in real time during the handoff, the bicasting request is made for additional use of the bicasting server 40. In the bicasting request, FAs associated with the handoff, i.e., the two FAs 5a and 5b that are used before and after the handoff are specified.

Therefore, the HA server 9 recognizes that it should use the bicasting server 40 in order to transmit IP packets to the mobile terminal 3 and the FAs 5a and 5b are concerned with the bicasting. Instead of the use of the regional registration message specifying the bicasting request, the HA server 9 can recognize that it should use the bicasting server 40 by using another method. For example, the HA server 9 can determine whether it should use the bicasting server 40 and can also determine FAs concerned with the bicasting based on either QoS information that has been obtained by negotiating with the mobile terminal 3 in advance by using a procedure defined by such a protocol as RSVP, or DSCP information about DiffServ.

When recognizing that it is necessary to use the bicasting server 40, the HA server 9 delivers bicasting setting information to both all of the plurality of IP tunnel routers 10a to 10c located in the IP network 1a, to which the HA server 9 belongs, and the bicasting server 40. The HA server 9 can perform the transmission of this bicasting setting information at the same time when the HA server performs the transmission of the IP tunnel setting information as explained in Embodiment 1.

When receiving the bicasting setting information, each of the plurality of IP tunnel routers 10a to 10c recognizes that the IP tunnel 12, which is one of routes extending to the mobile terminal 3 that is the destination, should be passed through the bicasting server 40. Therefore, each of the plurality of IP tunnel routers 10a to 10c does not select the care-of address of the FA 5a but selects the IP address of the bicasting server 40, as the encapsulated destination address, for IP packets destined for the mobile terminal 3.

When receiving the bicasting setting information, the bicasting server 40 becomes to be able to transfer an encapsulated IP packet associated with the bicasting setting information to both the FAS 5a and 5b. In other words, the IP tunnel 12 extending from the IP tunnel router 10c to the FA 5a is changed to the one including a route extending from the IP tunnel router 10c to the bicasting server 40 and two branches extending from the bicasting server 40 to the two FAs 5a and 5b.

Therefore, when an IP packet destined for the mobile terminal 3 is newly transmitted from a node (e.g., the CN 7) located outside the IP network 1a, the IP tunnel router 10c encapsulates the IP packet and transmits the encapsulated IP packet to the bicasting server 40, and the bicasting server 40 transfers the encapsulated IP packet to the FAs 5a and 5b. On the other hand, the mobile terminal 3 and the FAs 5a and 5b carry out various negotiations for the handoff and setting of communication conditions.

When the handoff is finished completely, the FA 5b that is newly used by the mobile terminal transmits a handoff completion notification to the mobile terminal 3. The mobile terminal 3 that has accepted the handoff completion notification transmits a regional registration message to the FA 5b. This regional registration message indicates the home address of the mobile terminal 3 and an IP address (i.e., a care-of address) indicating the FA 5b, and also indicates a bicasting completion request. Therefore, the HA server 9 recognizes that the mobile terminal 3 can newly obtain service provided by the FA 5b, and it is already unnecessary to use the bicasting server 40 in order to transmit IP packets to the mobile terminal 3.

When receiving the regional registration message, the HA server 9 updates registered information about the mobile terminal 3 stored in a storage unit thereof according to this regional registration message. Furthermore, the HA server 9 delivers the IP tunnel setting information indicating the mobile terminal 3 and the subnet from which the mobile terminal 3 newly receives service to both all of the plurality of IP tunnel routers 10a to 10c included in the IP network 1a, to which the HA server 9 belongs, and the bicasting server 40. Bicasting setting release information is indicated by this IP tunnel setting information.

When receiving the bicasting setting release information, the bicasting server 40 finishes transferring the encapsulated IP packet to the old FA 5a.

Furthermore, when receiving the bicasting setting release information, each of the plurality of IP tunnel routers 10a to 10c recognizes that it is already unnecessary to transfer IP packets destined for the mobile terminal 3 to the bicasting server 40 and each of the plurality of IP tunnel routers 10a to 10c only has to transfer IP packets to the FA 5b that is newly used by the mobile terminal. Therefore, each of the plurality of IP tunnel routers 10a to 10c does not select the IP address of the bicasting server 40 but selects the care-of address of the FA 5b, as the encapsulated destination address, for IP packets destined for the mobile terminal 3.

Therefore, when an IP packet destined for the mobile terminal 3 is newly transmitted from a node (e.g., the CN 7)

located outside the IP network 1a, the IP tunnel router 10c encapsulates the IP packet and transmits the encapsulated IP packet to the FA 5b, and the FA5b retrieves the original IP packet from the encapsulated IP packet and then delivers the original IP packet to the mobile terminal 3.

As mentioned above, in accordance with this embodiment 5, the proper use of the bicasting server 40 installed in the IP network 1a makes it possible to apply the mobile IP to a communication environment in which any delay time is not allowed to occur in IP packets.

In accordance with embodiment 5, instead of the single bicasting server 40 installed in the IP network 1a, a bicasting unit having a similar function can be installed in each of the plurality of IP tunnel routers 10a to 10c. In this case, when receiving the bicasting setting information, each of the plurality of IP tunnel routers transfers encapsulated IP packets to the two FAs by using in its own bicasting unit, and, when receiving the bicasting setting release information, transmits the encapsulated IP packet to the new FA.

Either a buffering server 30 or individual buffers in accordance with embodiment 4 can be incorporated into the IP network 1a having the bicasting server 40 or individual bicasting units. In this case, the HA server 9 determines whether the mobile network is placed in either a communication state in which any loss of IP packet is not permitted or a communication state in which any delay time is not allowed to occur in IP packets when a handoff occurs or before that. When the mobile network is placed in a communication state in which any loss of IP packet is not permitted, the HA server 9 selects the use of either the buffering server 30 or an individual buffer. In contrast, when the mobile network is placed in a communication state in which any delay time is not allowed to occur in IP packets, the HA server 9 selects the use of either the bicasting server 40 or an individual bicasting unit.

Embodiment 6

Next, a mobile network in accordance with embodiment 6 of the present invention will be explained. The mobile network in accordance with this embodiment 6 is a variation of either of the above-mentioned embodiments, and can have any structure as shown in FIGS. 1, 9, 10, or 12.

Next, a description will be made as to an operation of the mobile network in accordance with embodiment 6 of the present invention. In multiple IP networks, a plurality of subnets are connected to one another. However, a mobile terminal owned by a subscriber to a certain subnet might obtain roaming service provided by only one or more predetermined subnets according to a contract among companies for managing subnets and a technical common matter. For example, there is a possibility that a mobile terminal 3 can communicate with other mobile terminals that are under the charge of a lot of subnets when the mobile terminal 3 shown in the figure is staying in a subnet to which an FA 5a belongs, while the mobile terminal 3 can communicate with other mobile terminals that are under the charge of a smaller number of subnets when staying in another subnet to which another FA 5b belongs. In accordance with this embodiment, a subnet candidate which each mobile terminal can use is limitedly selected based on communication services that can be provided for each mobile terminal, and IP tunnel routers associated with the limitedly-selected subnets (i.e., available IP tunnel routes) are selected in advance.

Every time when receiving a regional registration message from a mobile terminal (e.g., the mobile terminal 3), an HA server 9 of a virtual HA 8 determines all subnet candidates in which terminals that become the other party of communication with the mobile terminal can exist. This determination can be carried out based on information which the mobile terminal 3 sets to the regional registration message. As an alternative, the HA server 9 can determine all subnet candidates based on session information that is acquired when the mobile terminal 3 and the HA server 9 negotiate with each other by using a procedure defined by such a protocol as RSVP or SIP (Session Initiation Protocol) before the mobile terminal 3 transmits the regional registration message.

The HA server 9 the selects IP tunnel routers (e.g., only IP tunnel routers 10a and 10c) that can be used for communication with the mobile terminal 3 based on this determination. The selected IP tunnel routers that can be used are connected directly to all the selected subnet candidates (e.g., only the subnet to which the FA 5a belongs and an IP network 1b), respectively, and are IP tunnel routers that become gateways of those subnets. After that, the HA server 9 transmits IP tunnel setting information only to the selected IP tunnel routers (i.e., IP tunnel routers which the mobile terminal 3 can use) (see FIG. 3).

As mentioned above, in accordance with this embodiment 6, because the HA server 9 transmits the IP tunnel setting information only to selected IP tunnel routers which the mobile terminal can use, the entire number of control messages transmitted from the HA server 9 to the plurality of IP tunnel routers within the mobile network can be reduced.

Embodiment 7

Next, a mobile network in accordance with embodiment 7 of the present invention will be explained. The mobile network in accordance with this embodiment 7 is a variation of either of above-mentioned embodiments, and can have any structure as shown in FIGS. 1, 9, 10, or 12.

Next, a description will be made as to an operation of the mobile network in accordance with embodiment 7 of the present invention. In multiple IP networks, various types of mobile terminals can be used. They can obtain different communication services (speech communication, moving picture communication, internet access, and so on) according to their types. In accordance with this embodiment, subnet candidates which each mobile terminal can use are limitedly selected based on communication services that can be provided for each mobile terminal, and IP tunnel routers associated with the selected subnets (i.e., available IP routers) are selected in advance.

Every time when receiving a regional registration message from a mobile terminal (e.g., a mobile terminal 3), an HA server 9 of a virtual HA 8 determines communication service which can be provided for the mobile terminal. This determination can be carried out based on information which the mobile terminal 3 sets to the regional registration message. As an alternative, the HA server 9 can determine communication service which can be provided for the mobile terminal based on session information that is acquired when the mobile terminal 3 and the HA server 9 negotiate with each other by using a procedure defined by such a protocol as RSVP or SIP before the mobile terminal 3 transmits the regional registration message.

The HA server 9 then selects subnet candidates that can provide the determined communication service based on this determination, and selects IP tunnel routers (e.g., only IP tunnel routers 10a and 10c) according to the selected subnet candidates. T he IP tunnel routers that can be used are connected directly to the subnet candidates (e.g., only a subnet to which an FA 5a belongs and an IP network 1b), respectively, and are IP tunnel routers that become gateways for those subnets. After that, the HA server 9 transmits IP tunnel setting information only to the selected IP tunnel routers (i.e., IP tunnel routers which the mobile terminal 3 can use) (see FIG. 3).

As mentioned above, in accordance with this embodiment 7, because the HA server 9 transmits the IP tunnel setting information only to selected IP tunnel routers which the mobile terminal can use, the entire number of control messages transmitted from the HA server 9 to the plurality of IP tunnel routers within the mobile network can be reduced. It is also possible to combine the concept in accordance with embodiment 6 and that in accordance with embodiment 7.

Embodiment 8

Figure 14:
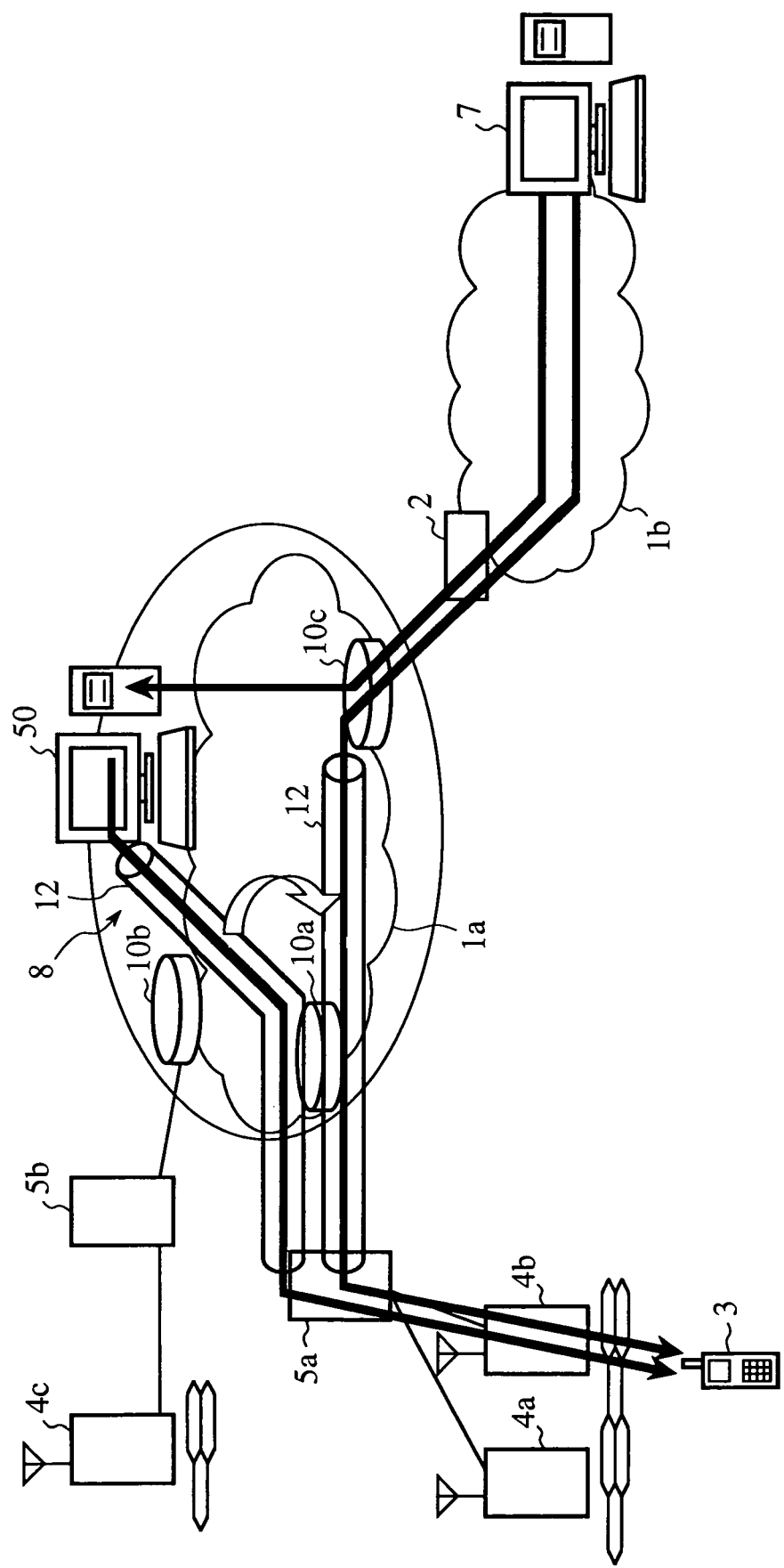
FIG. 14 is a diagrammatic view showing the structure of a mobile network in accordance with embodiment 8 of the present invention.

FIG. 14 shows a mobile network and multiple IP networks in accordance with embodiment 8 of the present invention. In the figure, reference numeral 50 denotes an HA server. This HA server 50 can have an IP tunnel function and can handle user traffic, unlike the HA server 9 of the mobile network in accordance with any one of above-mentioned embodiments. Other nodes are the same as those as shown in FIG. 1. A virtual HA 8 has this HA server 50 and a plurality of IP tunnel routers 10a to 10c.

Next, a description will be made as to an operation of the mobile network in accordance with embodiment 8 of the present invention. The following explanation will be made with reference to FIG. 15 that is a control flow diagram showing a sequence of control executed among various nodes in the multiple IP networks of embodiment 8.

As previously explained in Embodiment 1, a mobile terminal 3 transmits a regional registration message to an FA 5a first, and the FA 5a transmits a second regional registration message specifying the home address of the mobile terminal 3 and an IP address (i.e., a care-of address) indicating the FA 5a to the HA server 50. Therefore, the HA server 50 recognizes that the mobile terminal 3 can obtain service provided by the FA 5a.

When receiving the second regional registration message, the HA server 50 updates registered information about the mobile terminal 3 stored in a storage unit thereof according to this second regional registration message. However, even if receiving the second regional registration message, the HA server 50 doesn't deliver IP tunnel setting information to the plurality of IP tunnel routers 10a to 10c that are under the charge thereof at once. To be more precise, the HA server 50 doesn't deliver the IP tunnel setting information if there is no necessity to transmit IP packets destined for the mobile terminal 3.

On the other hand, because the HA server 50 has an IP tunnel function and can handle user traffic when it is necessary to transmit IP packets destined for the mobile terminal 3, as previously mentioned, the HA server 50 voluntarily processes the first IP packet associated with the second regional registration message and destined for the mobile terminal 3.

Figure 15:
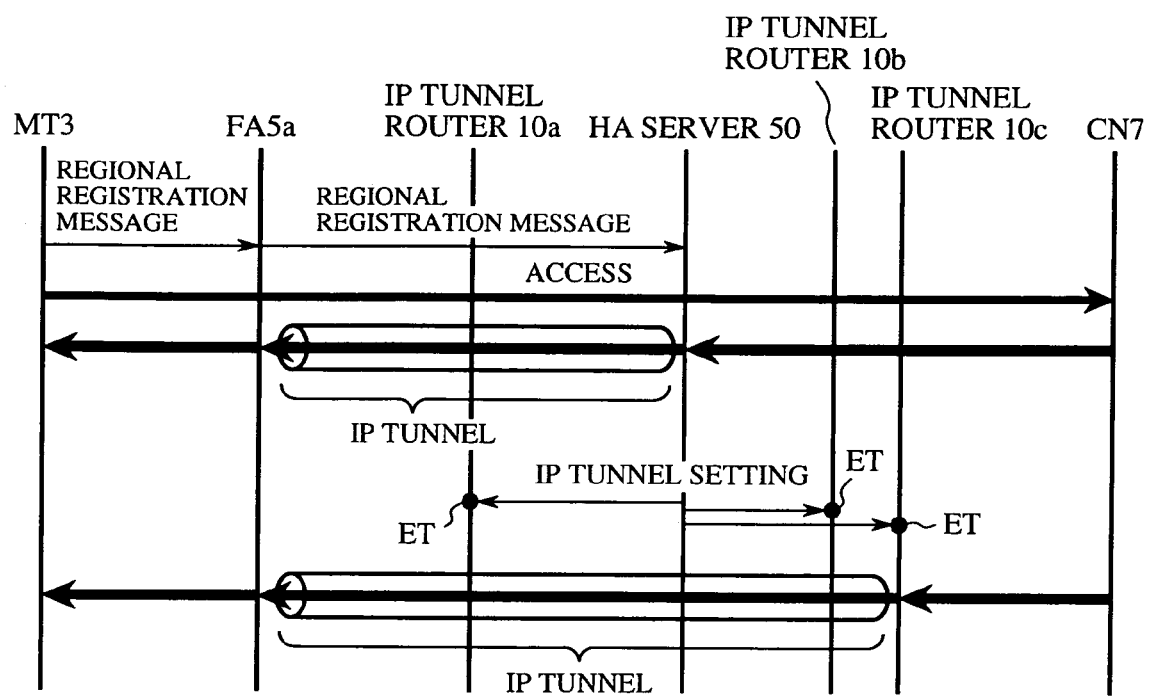
FIG. 15 is a control flow diagram showing a control sequence executed among various nodes within multiple IP networks including the mobile network in accordance with embodiment 8 of the present invention.

For example, it is assumed that a CN 7 issues an IP packet destined for the mobile terminal 3 (see FIGS. 14 and 15). The CN 7 can carry out this issue of the IP packet when the mobile terminal 3 accesses the CN 7 connected to the Internet (i.e., an IP network 1b), as shown in FIG. 15. As an alternative, the CN 7 can transmit the IP packet to the mobile terminal 3 without the mobile terminal 3 getting such access to the CN 7 and making a request for transmission of data.

The IP packet transmitted from the CN 7 and destined for the mobile terminal 3 is received by the IP tunnel router 10c by way of a network gateway 2. The IP tunnel router 10c then refers to the destination address of the header of the received IP packet, and recognizes that this destination address is not described in the destination address field of a tunnel processing information file (see FIG. 4). This is because at that time each of the plurality of IP tunnel routers 10a to 10c is not notified that the mobile terminal 3 has moved from the IP network 1a and therefore the home address of the mobile terminal 3 is not registered in the destination address of the tunnel processing information file. According to this recognition, the IP tunnel router 10c transfers the IP packet to the HA server 50 without encapsulating them.

The HA server 50 encapsulates this first IP packet (having an encapsulated destination address specifying the FA 5a), and transmits the encapsulated first IP packet to the FA 5a. At this time, an IP tunnel 12 extending from the HA server 50 to the FA 5a is temporarily established.

The HA server 50 delivers the IP tunnel setting information indicating the mobile terminal 3 and a subnet from which the mobile terminal 3 newly obtains service to all of the plurality of IP tunnel routers 10a to 10c included in the IP network 1a to which the HA server 50 belongs. When receiving the IP tunnel setting information, each of the plurality of IP tunnel routers 10a to 10c updates the tunnel processing information file stored in a storage unit thereof according to this IP tunnel setting information (designated by reference character ET as shown in FIG. 15). When the tunnel processing information file is updated in each of the plurality of IP tunnel routers 10a to 10c, each of the plurality of IP tunnel routers 10a to 10c can transfer IP packets that have caused the updating of the tunnel processing information file and that are destined for the mobile terminal 3 by way of the IP tunnel. Therefore, the IP tunnel router 10c then performs encapsulation on IP packets transmitted thereto from the CN 7 and destined for the mobile terminal 3, and transfers them to the mobile terminal by using the IP tunnel 12 extending from the IP tunnel router 10c to the FA 5a or 5b.

Thus, once IP communications with the mobile terminal 3 are started, the IP tunnel 12 is made to change from the one extending from the HA server 50 to the FA 5a to the one extending from the IP tunnel router 10c to the FA 5a or 5b. However, when each of the plurality of IP tunnel routers 10a to 10c recognizes that there is no traffic for a certain time period after the last traffic using the new IP tunnel 12 has been finished or after the tunnel processing information file has been updated, each of the plurality of IP tunnel routers 10a to 10c can automatically return the updated tunnel processing information file into its previous state. This automatic returning process can reduce the load on each of the plurality of IP tunnel routers 10a to 10c.

As mentioned above, in accordance with this embodiment 8, the HA server 50 doesn't send out the IP tunnel setting information when there is no necessity to transmit IP packets destined for the mobile terminal that has left from the subnet to which the HA server 50 belongs. Therefore, the entire number of control messages transmitted from the HA server 50 to the plurality of IP tunnel routers 10a to 10c included in the mobile network can be reduced.

Furthermore, because the HA server 50 has an IP tunnel function and can handle user traffic, the HA server 50 can transfer IP packets destined for the mobile terminal that has left from the subnet to which the HA server 50 belongs without loss of those IP packets even when catching them.

Embodiment 9

At least one of the concepts in accordance with embodiments 6 and 7 can be combined with a mobile network in accordance with embodiment 8.

Concretely, every time when receiving a regional registration message from a mobile terminal (e.g., a mobile terminal 3), an HA server 50 of a virtual HA 8 determines subnet candidates in which there can exist a terminal that becomes the other party of a communication with the mobile terminal and communication service that can be provided to the mobile terminal. This determination can be carried out based on information which the mobile terminal 3 sets to the regional registration message. As an alternative, the HA server 50 can determine subnet candidates based on session information acquired when the mobile terminal 3 negotiates with the HA server 50 by using a procedure defined by such a protocol as RSVP or SIP before the mobile terminal 3 transmits the regional registration message.

The HA server 50 selects subnet candidates that can provide available communication service to the mobile terminal from among all subnet candidates, and selects IP tunnel routers (e.g., only IP tunnel routers 10a and 10c) associated with the subnet candidates.

After that, when catching the first IP packet sent from a CN 7 and destined for the mobile terminal 3, the HA server 50 handles this IP packet and transmits IP tunnel setting information only to the selected IP tunnel routers (i.e., IP tunnel routers which the mobile terminal 3 can use) (see FIG. 15), like that of embodiment 8.

As mentioned above, in accordance with this embodiment 9, the same advantage as provided by embodiment 8 is offered. Furthermore, because the HA server 50 transmits the IP tunnel setting information only to selected IP tunnel routers which the mobile terminal can use, the entire number of control messages transmitted from the HA server 50 to all IP tunnel routers included in the mobile network can be reduced.

The following improvement can be made to the mobile network in accordance with this embodiment 9. There is a possibility that an IP tunnel router not selected receives an IP packet destined for the mobile terminal 3 that has moved to another subnet from a subnet other than expected. Such an IP packet is still transferred to the HA server 50. When catching this IP packet, the HA server 50 handles the IP packet, like that of embodiment 8, and transmits the IP tunnel setting information not only to the selected IP tunnel routers but also to the IP tunnel router that has transmitted the IP packet thereto. In accordance with this improvement, even when receiving an IP packet from an IP tunnel router not selected, an appropriate IP tunnel can be established.

Embodiment 10

Figure 16:
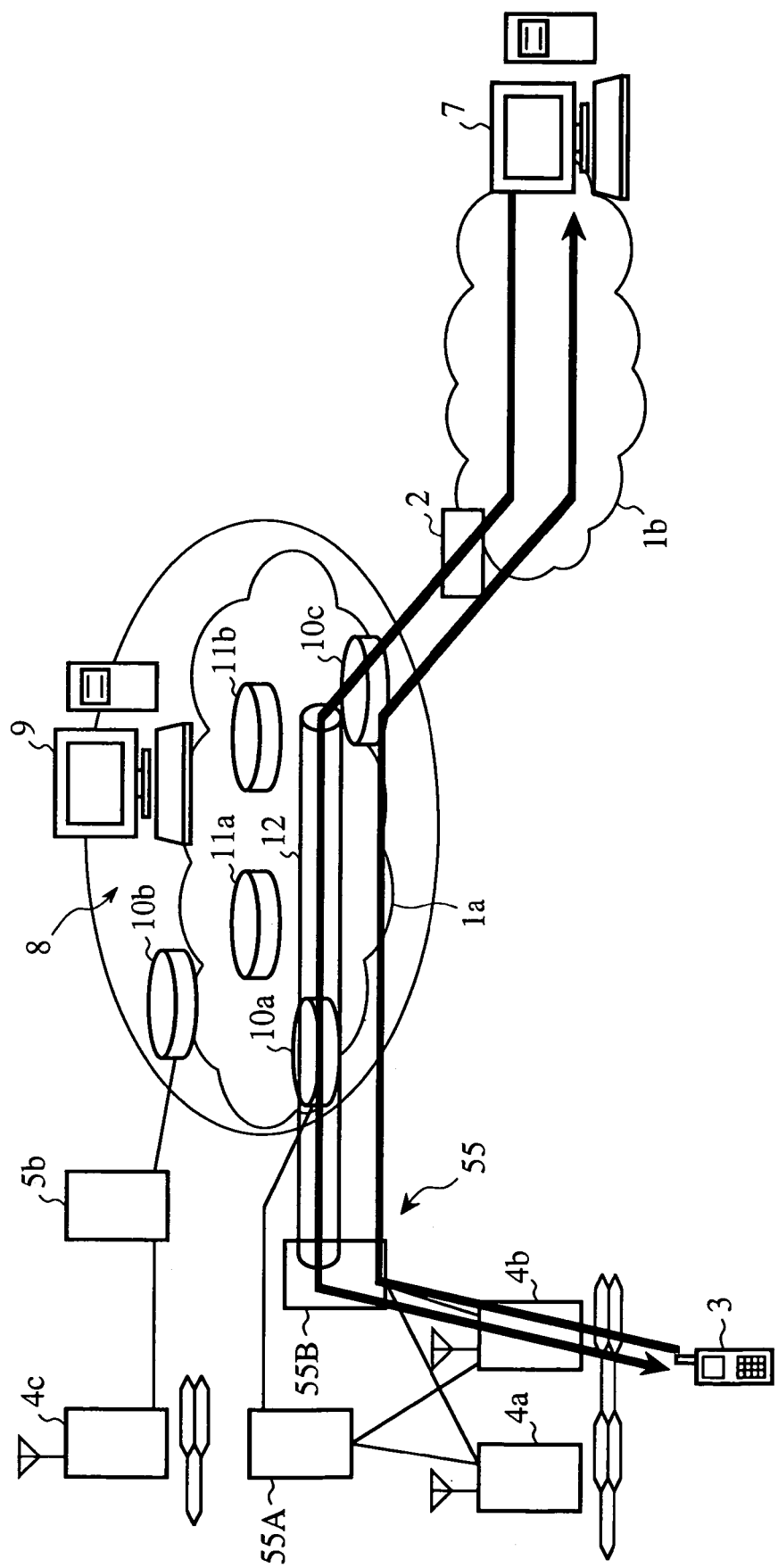
FIG. 16 is a diagrammatic view showing the structure of a mobile network in accordance with embodiment 10 of the present invention.

FIG. 16 shows a mobile network and multiple IP networks in accordance with embodiment 10 of the present invention. In the figure, reference numeral 55 denotes a virtual FA (i.e., a foreign agent), reference numeral 55A denotes a FA server, and reference numeral 55B denotes an IP tunnel router. In accordance with this embodiment, the load on the foreign agent is spread over the multiple IP networks. The virtual FA 55 is provided with the FA server 55A and the IP tunnel router 55B. The FA server 55A and the IP tunnel router 55B can be disposed in one gateway.

Next, a description will be made as to an operation of the mobile network in accordance with embodiment 10 of the present invention. Assume that a mobile terminal (e.g., a mobile terminal 3) that joins either (e.g., an IP network 1a) of subnets included in the multiple radio networks moves to another subnet (i.e., a mobile network) in which the virtual FA 55 is installed, and the mobile terminal does not join the other subnet. When detecting that the mobile terminal 3 has moved to an area that is under the charge of the virtual FA 55, the mobile terminal 3 transmits a regional registration message that complies with mobile IP to the FA server 55A. Because the home address of the mobile terminal 3 is indicated by this regional registration message, the FA server 55A recognizes that the mobile terminal 3 with this home address has moved to the area that is under the charge of the subnet associated therewith.

When receiving this regional registration message, the FA server 55A assigns an identifier effective in the subnet associated therewith to the mobile terminal 3 by carrying out internal processing, associates this identifier to the home address of the mobile terminal 3, and notifies it to the IP tunnel router 55B. In addition, the FA server 55A transmits a regional registration message of another type (i.e., a second regional registration message) to an HA server 9. This second regional registration message indicates the home address of the mobile terminal 3 and an IP address (i.e., a care-of address) indicating the IP tunnel router 55B.

A virtual HA 8 carries out processing similar to that as explained in Embodiment 1 based on the second regional registration message. IP tunnel setting information indicates the home address of the mobile terminal 3 and the IP address (i.e., the care-of address) indicating the IP tunnel router 55B. The care-of address indicating the IP tunnel router 55B is used as an encapsulated destination address.

An IP packet sent from a CN 7 and destined for the mobile terminal 3 is received by an IP tunnel router 10c by way of a network gateway 2. The IP tunnel router 10c refers to a destination address included in the header of the IP packet, encapsulates the IP packet, and then transfers the encapsulated IP packet to the IP tunnel router 55B. The IP tunnel router 55B decapsulates the encapsulated IP packet into an IP packet in its original format, and delivers the IP packet to the mobile terminal 3 by using an identifier effective in the subnet associated therewith. Thus, in the subnet to which the virtual FA 55 belongs, the IP tunnel router 55B transfers the IP packet to the mobile terminal 3 without making it pass through the FA server 55A.

In communications in a backward direction from the mobile terminal 3 that is a sending source to the CN 7, either a method of transmitting IP packets by way of a normal routing path or a method of using a reverse IP tunnel (see FIG. 6) can be used.

As mentioned above, in accordance with this embodiment 10, because an IP tunnel router can transfer IP packets to a mobile terminal that roams into a corresponding mobile network without making them pass through a foreign agent server, the traffic carried by and the load imposed on the foreign agent server can be reduced. Therefore, the occurrence of a bottleneck point can be prevented and further smooth communications are implemented as compared with the prior art. Furthermore, the scalability of the multiple IP networks is improved.

While the present invention has been illustrated and described in detail with reference to preferred embodiments thereof, it will be understood by those skilled in the art that various changes in form and details can be made therein without departing from the spirit and scope of the invention defined in the appended claims, and all such changes, replacements and modifications that fall within meets and bounds of the claims are therefore intended to be embraced by the claims.

INDUSTRIAL APPLICABILITY

As mentioned above, in accordance with the present invention, there can be provided a mobile network that can prevent concentration of loads on one piece of equipment.

The invention claimed is:

1. A mobile network that is a first subnet that partially constitutes multiple IP networks, said mobile network comprising:
   a home agent server configured to manage identifiers of a plurality of mobile terminals, each of which is joined to said mobile network;
   a plurality of IP tunnel routers that include a first IP tunnel router connecting said mobile network to a network having a correspondent node and a second IP tunnel router connecting the mobile network to a second subnet that partially constitutes said multiple IP networks; and
   at least one buffer for temporarily storing IP packets,
   wherein when a mobile terminal of the plurality of mobile terminals moves to the second subnet, said home agent server is configured to accept destination information necessary for transmission of IP packets to said mobile terminal from said mobile terminal, and deliver IP tunnel setting information indicating said mobile terminal and said destination information to said plurality of IP tunnel routers,
   when the first IP tunnel router receives an IP packet from the correspondent node destined for said mobile terminal, said first IP tunnel router is configured to transfer said IP packet to said mobile terminal via said second IP tunnel router based on said IP tunnel setting information without transferring said IP packet to said home agent server, and
   when recognizing an occurrence of a handoff of said mobile terminal, said home agent server is configured to control each of said plurality of IP tunnel routers and said buffer so that each of said plurality of IP tunnel routers stores received IP packets destined for said mobile terminal in said buffer, when recognizing completion of the handoff of said mobile terminal, said home agent server is configured to control said buffer so that said buffer transfers the IP packets stored therein to said mobile terminal, and, when then receiving an IP packet destined for said mobile terminal, said home agent server is configured to control each of said IP tunnel routers so that each of said IP tunnel routers transfers the IP packet to said mobile terminal based on the IP tunnel setting information without transferring the IP packet to said home agent server.

2. A mobile network that is a first subnet that partially constitutes multiple IP networks, said mobile network comprising:
   a home agent server configured to manage identifiers of a plurality of mobile terminals, each of which is joined to said mobile network;
   a plurality of IP tunnel routers that include a first IP tunnel router connecting said mobile network to a network having a correspondent node and a second IP tunnel router connecting the mobile network to a second subnet that partially constitutes said multiple IP networks; and
   a bicasting unit configured to create a copy of an IP packet received from the correspondent node and destined for a mobile terminal of the plurality of mobile terminals, and to transmit both the received IP packet and the copy by way of different routes,
   wherein when the mobile terminal moves to the second subnet, said home agent server is configured to accept destination information necessary for transmission of IP packets to said mobile terminal from said mobile terminal, and deliver IP tunnel setting information indicating said mobile terminal and said destination information to said plurality of IP tunnel routers,
   when the first IP tunnel router receives the IP packet from the correspondent node destined for said mobile terminal, said first IP tunnel router is configured to transfer said IP packet to said mobile terminal via said second IP tunnel router based on said IP tunnel setting information without transferring said IP packet to said home agent server, and
   when recognizing an occurrence of a handoff of said mobile terminal, said home agent server is configured to control each of said plurality of IP tunnel routers and said bicasting unit so that each of said plurality of IP tunnel routers transmits the IP packet by using said bicasting unit, and said bicasting unit transmits both the IP packet and the copy by way of two routes that are used before and after the handoff, respectively, according to control done by said home agent server, and, when recognizing completion of the handoff of said mobile terminal, said home agent server is configured to control each of said plurality of IP tunnel routers so that each of said plurality of IP tunnel routers terminates a transfer of IP packets to said bicasting unit, and, when then receiving an IP packet destined for said mobile terminal, said home agent server is configured to control each of said plurality of IP tunnel routers so that each of said IP tunnel routers transfers the IP packet to said mobile terminal based on the IP tunnel setting information without transferring the IP packet to said home agent server.

* * * * *